United States Patent
Hertel et al.

(10) Patent No.: US 6,457,769 B2
(45) Date of Patent: Oct. 1, 2002

(54) MOTOR VEHICLE SUNROOF

(75) Inventors: Johann Hertel, Neuried; Thomas Staltmayer, Gauting, both of (DE); Shigeru Ueki; Hiroshi Tanaka, both of Higashi-Hiroshima (JP)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/748,122

(22) Filed: Dec. 27, 2000

(30) Foreign Application Priority Data

Dec. 27, 1999 (JP) ............................................ 11-371378

(51) Int. Cl.⁷ .................................................. B60J 7/22
(52) U.S. Cl. ...................................................... 296/217
(58) Field of Search .............................. 296/217, 180.1

(56) References Cited

U.S. PATENT DOCUMENTS 4,966,409 A * 10/1990 Schmidhuber et al. .. 296/217 X
5,484,184 A * 1/1996 Kohlpaintner et al. ...... 296/217

FOREIGN PATENT DOCUMENTS

| DE | 33 08 065 A1 | 9/1983 | |
|----|----|----|----|
| DE | 3419900 | * 11/1985 | ................ 296/217 |
| EP | 0442773 | * 8/1991 | ................ 296/217 |

* cited by examiner

Primary Examiner—Dennis H. Pedder
(74) Attorney, Agent, or Firm—Nixon Peabody LLP; David S. Safran

(57) ABSTRACT

A sunroof for a motor vehicle having roof with an opening, the sunroof including a cover panel for closing the roof opening, a pair of guide rails for supporting the cover panel, a drive device for moving the cover panel vertically and horizontally with relative to the roof in a open and closed position. The sunroof also includes a shade device which can be pulled vertically to cover panel the drive device from the inside while the cover panel is in the open position. The shade device is mounted such that it is fixed with respect to a respective guide rail in a lengthwise direction relative to the roof, while the cover panel is mounted such that it can be moved in the lengthwise direction with respect to the shade device.

22 Claims, 19 Drawing Sheets

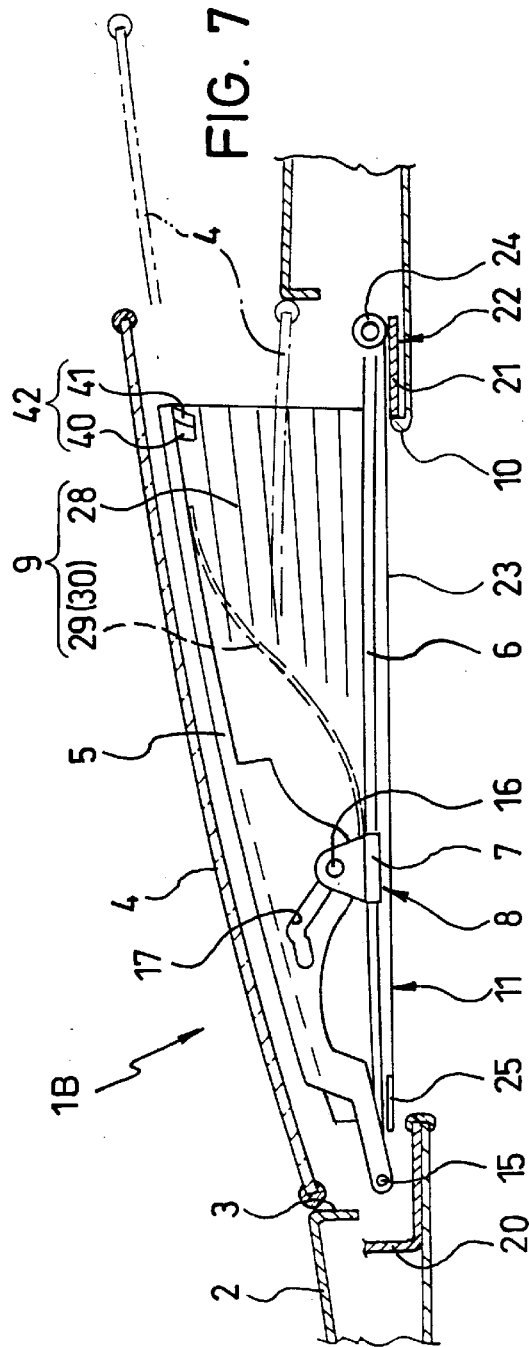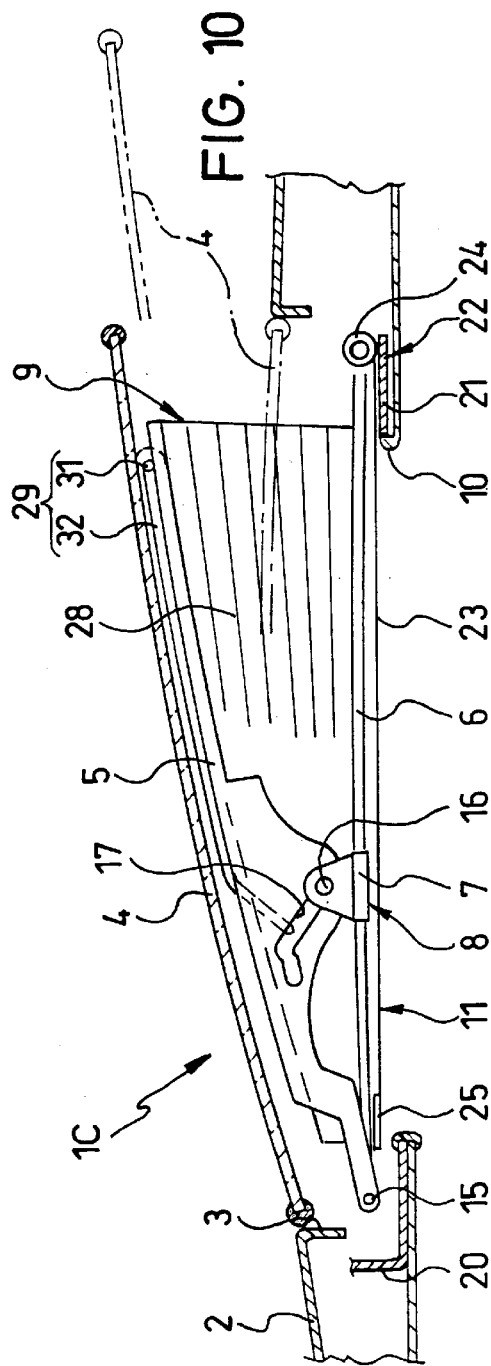

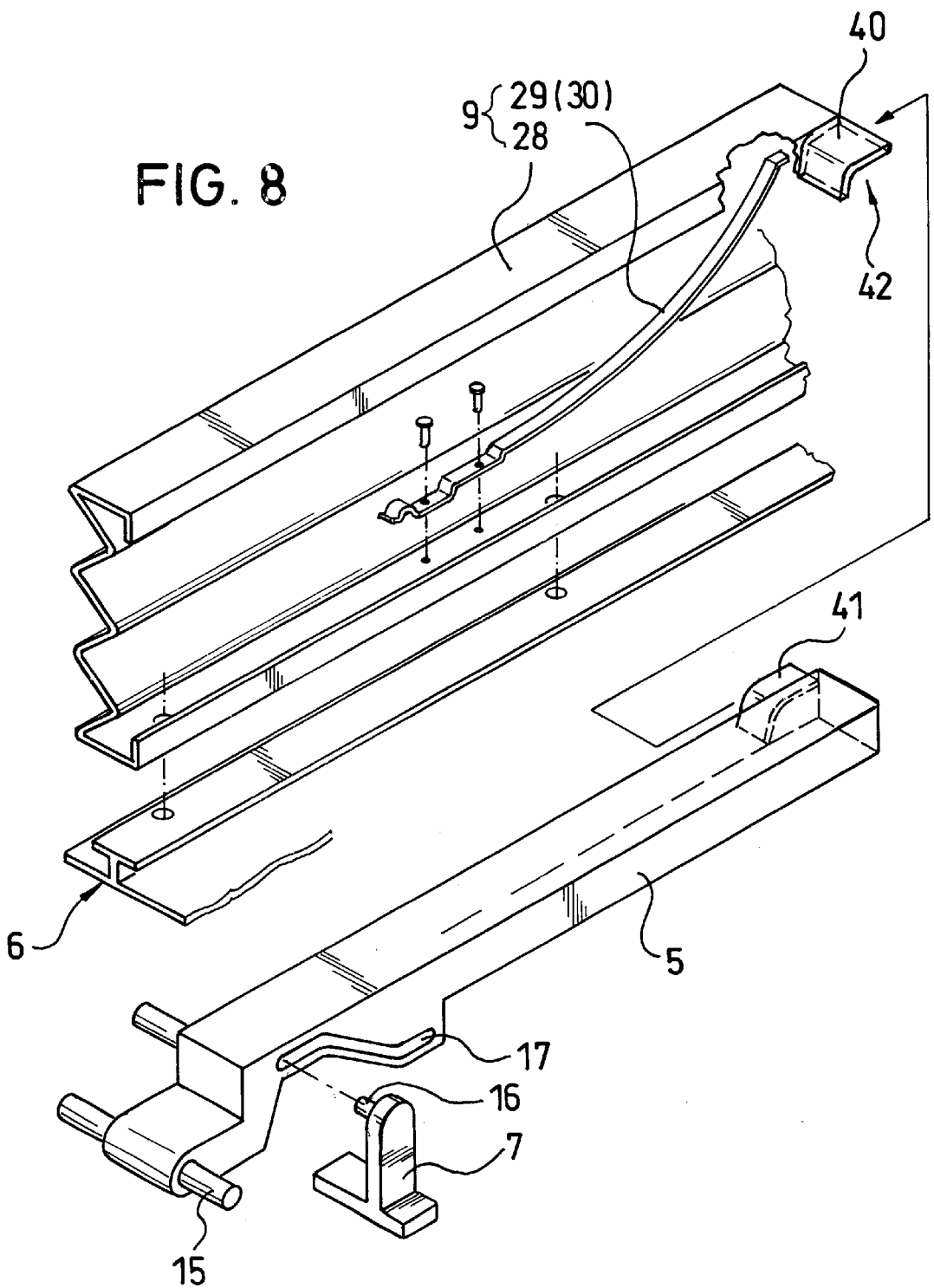

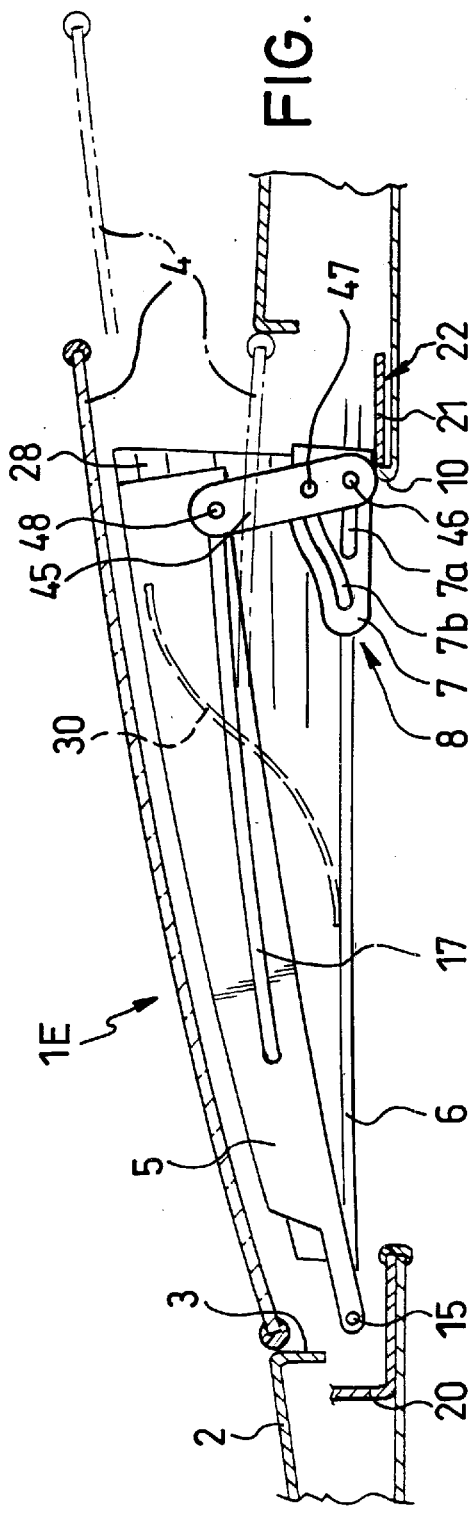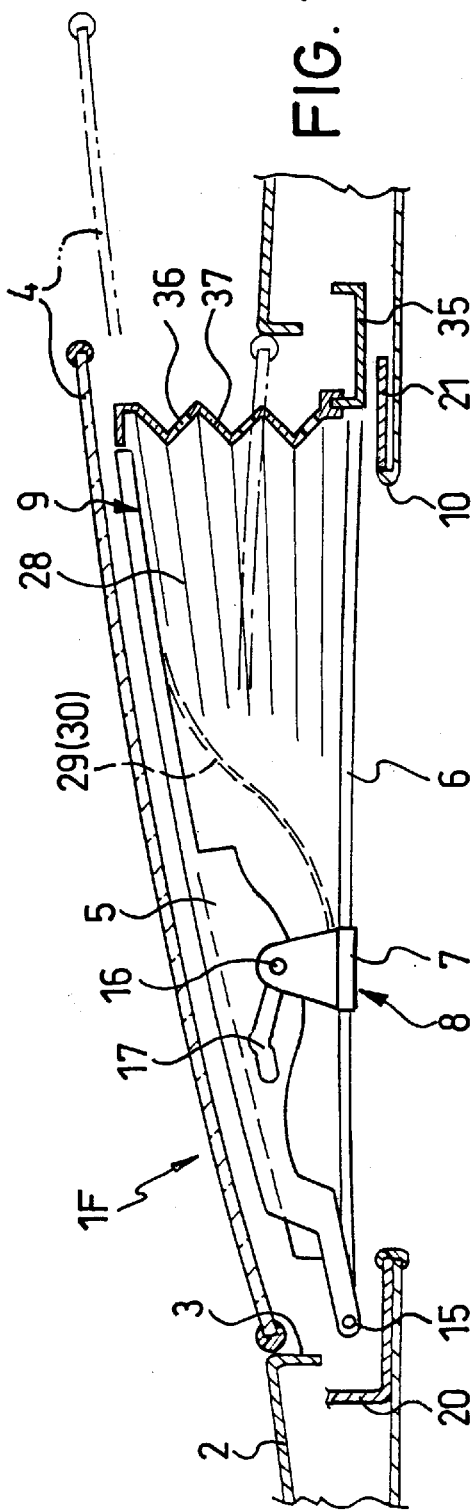

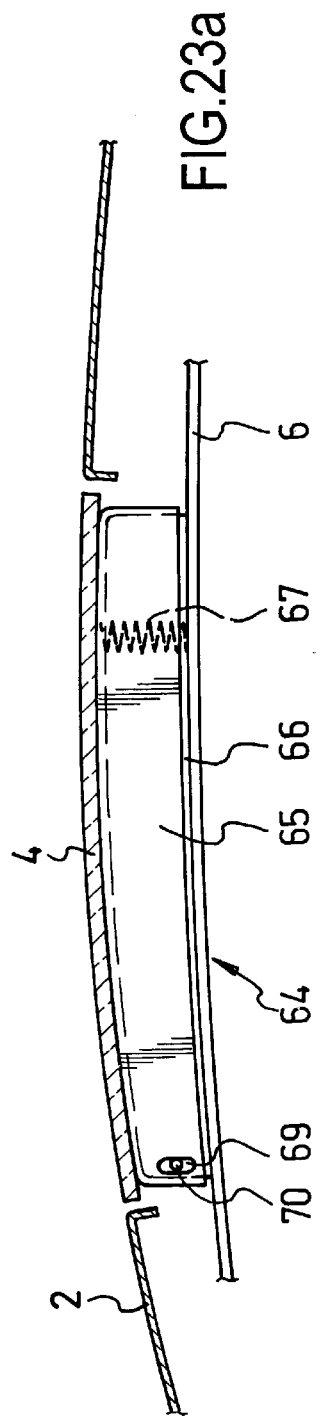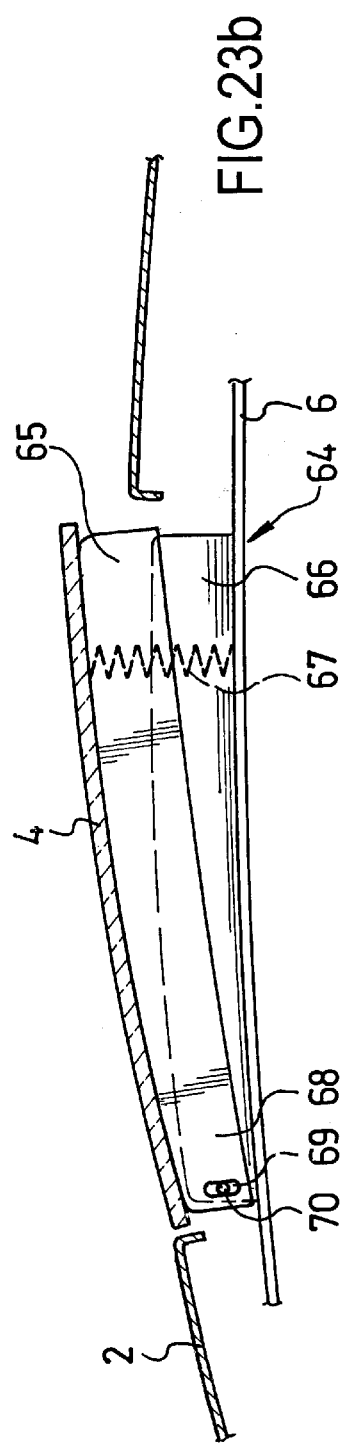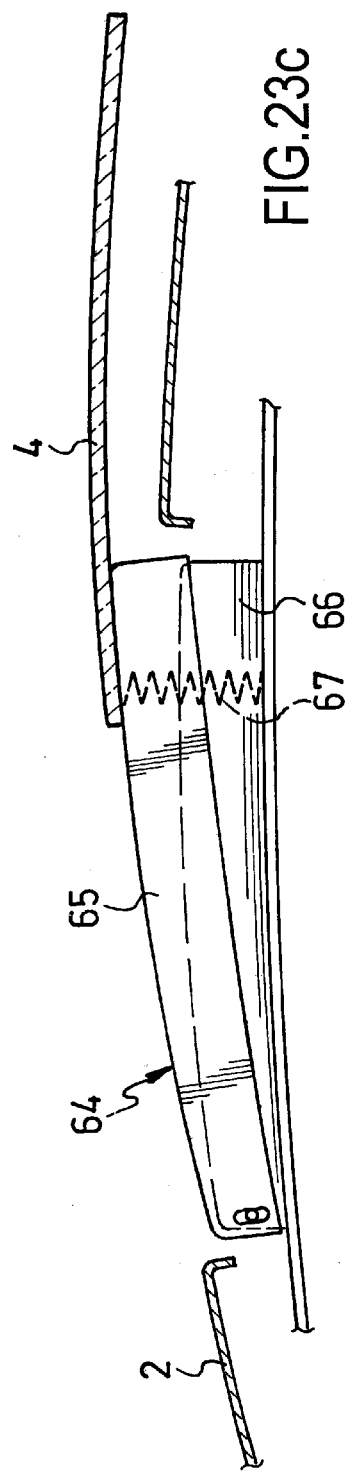

MOTOR VEHICLE SUNROOF

BACKGROUND OF THE INVENTION

1. Field of the Invention

The invention relates generally to a sunroof for a motor vehicle. More particularly, the invention is directed to a sunroof for preventing wind from flowing into a compartment of the vehicle while hiding a cover panel driving device and which also covers the drive device from the inside once the cover panel is place in a raised position.

2. Description of the Related Art

One such sunroof is conventionally formed as an inner or internally guided sliding and lifting roof in which the cover panel can be pivoted up out of its position to completely close the roof opening, and is pivoted downward before displacement which is pointed to the rear and is pushed to the rear from its lowered position underneath the roof skin. Another conventional sunroof includes an outer or externally guided sliding and lifting roof whereby its cover panel is pivoted upward and is pushed to the rear running on the outside. German Patent DE 33 08 065 discloses an internally guided sliding and lifting roof which has a cover panel for closing or clearing the roof opening, on both sides of the cover panel there being a shade which is mounted either on the cover panel or on the roof frame. A similar sunroof is described in Japanese Utility Model Disclosure Document No. 139320 and contains a shade of the bellows type.

SUMMARY OF THE INVENTION

Accordingly, it is an object of the invention to provide a sunroof for a motor vehicle which includes a cover member having improved mobility during opening and closing process of the cover panel and also in the different types of sunroofs. This object is achieved by a sunroof with a cover member that can be pulled apart vertically, such a cover member being defined as a shade of any type which can be stretched or expanded in the vertical direction, for example an accordion or fan shade, a fabric shade or a bellows shade. The cover panel serves to cover the drive mechanism so that it is not visible from the inside of the vehicle while the cover panel is pivoted in an upward raised position. While the cover panel is in its raised position, the cover member is pulled apart to cover the drive means and is used at the same time as protection against wind flow from outside the motor vehicle and also when the cover panel is pushed to the rear, the shade retains a protective function.

In one preferred embodiment, a bottom section of the cover member is fixed on the vehicle roof while a top section is movably supported on the cover panel and is held on its front end by a roof-mounted bearing means which allows vertical compensation motion for the front end of the top section of the cover member. As a result, the cover member can be better adapted to the pivoted-out positions of the cover panel. Accordingly, the cover member is divided into a top section and a bottom section which are connected to one another and which can be moved against one another in the lengthwise direction, and the top section of the cover member being fixed on the cover panel and the bottom section being fixed on the solid roof, the shade function is preserved even when the displacement of the raised cover panel is directed backwards.

BRIEF DESCRIPTION OF THE DRAWINGS

FIG. 7 shows in a side cross sectional view a second embodiment of the invention;

FIG. 8 shows in a perspective exploded view a raising device and a cover member according to the second embodiment of the invention;

FIG. 10 shows in a schematic lengthwise cross sectional view a third embodiment of the invention;

FIG. 15 shows in a lengthwise sectional view a fifth embodiment of the invention;

FIG. 17 shows in a schematic lengthwise sectional view a sixth embodiment of the invention;

FIG. 23(a)–23(c) shows in perspective views another embodiment of the shade;

BRIEF DESCRIPTION OF THE PREFERRED EMBODIMENTS

Figure 1:
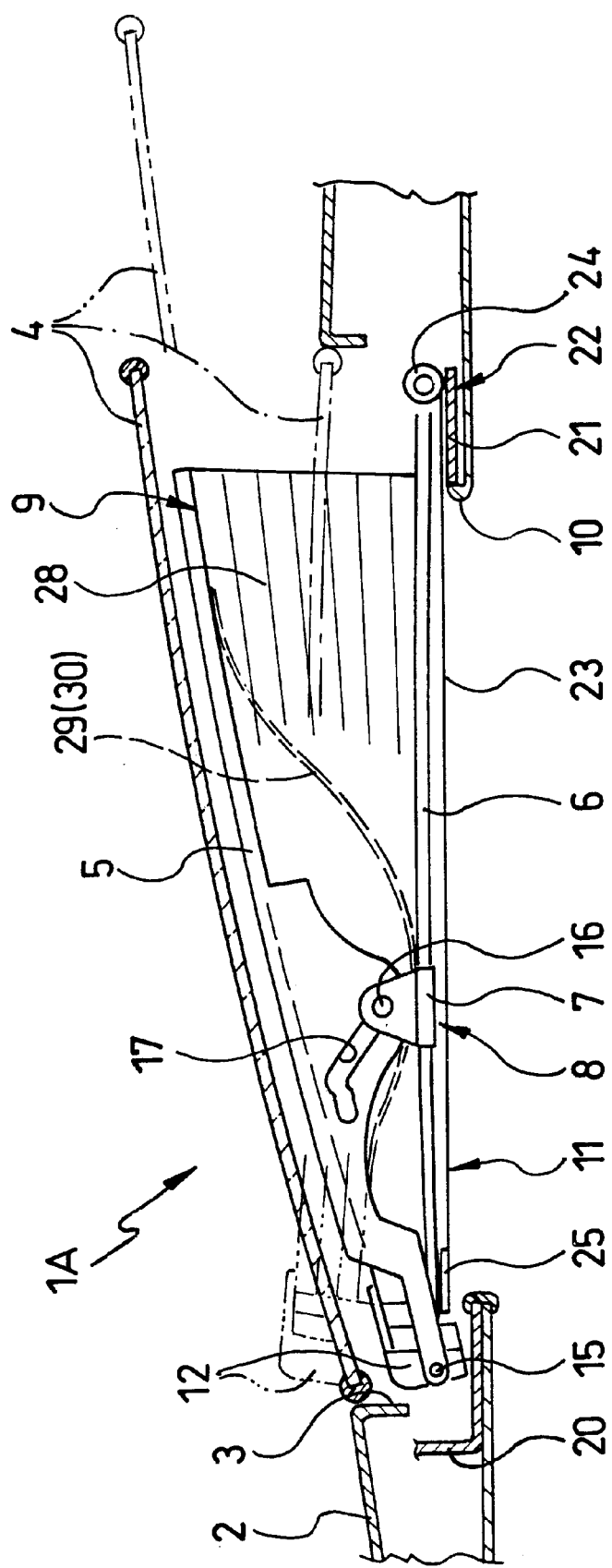
FIG. 1 shows in a schematic cross sectional side view a first embodiment of the invention.

With reference now to the drawings, FIGS. 1–6 show a first embodiment of a raisable sliding sunroof 1A mounted on a solid roof 2 of a motor vehicle such as a passenger car having a roof. The sunroof 1A includes a cover panel 4 for clearing or closing and opening 3 formed in the solid roof 2, the cover panel 4 in a raised position having the ability to be moved to the rear of the sunroof 1A. The sunroof 1A further includes a left and a right raising lever 5 which are located on the bottom of the cover panel 4 on the left and the right side, a guide rail 6 for movable supporting the front section of the left and the right raising lever 5 in the lengthwise direction, a drive 8 for at least one of lifting and lowering the raising lever 5 and pushing back the raising lever 5 while in a raised position by moving a slider 7 supported on a guide rail 6 in the lengthwise direction. A cover member 9 is located between the guide rail 6 and the cover panel 4, the cover member 9 is provided including a sliding head lining or sun shade 11 for clearing or closing an inside opening 10 located underneath the opening 3 of the roof 2, and a wind deflector 12 aligned in the front section of the opening 3 when the opening 3 is cleared.

Preferably, the cover panel 4 is made of transparent or translucent glass or plastic and includes a protective frame and a seal which is mounted on the bottom on the periphery of the cover panel 4. The protective frame is mounted on the left and the right raising lever 5 by means of pins. The left and the right raising lever 5 in their front section each contain a sliding block 15 which move in the guide rail 6 by sliding and in its middle section a crank slot 17 which descends to the rear and engages a pin 16 on the slider 7. The crank slot 17 is formed by mounting a crank plate on the raising lever 5 or directly on the raising lever 5. The pin 16 and the crank slot 17 together form with the raising lever 5 components of the drive means 8.

The cover panel 4 is raised from a closing position which completely closes the opening 3 (partially shown in FIG. 1 with a dot-dash line) into a raised position (shown in FIG. 1 with the solid line) by pushing the pin 16 in the lengthwise direction of the crank slot 17 using the slider 7, this is accomplished by sliding. The cover panel 4 is pushed to the rear of the roof 2 into a position in which the opening 3 is completely open (shown in FIG. 1 by a line which is dot-dashed with two dots) by moving the pin 16 farther to the rear away from the position which corresponds to the raised position of the cover panel 4. The cover panel 4 can also be moved out of its completely opened position into its completely closed position by moving the slider 7 forward.

A drive cable (not shown) is connected to each of the left and right slider 7 and is driven via a drive gear by a motor. The left and the right guide rail 6 are connected to one another by a front frame part 20 and a middle frame part 21 and these parts in addition to the guide rails 6 form a support frame 22 for the sunroof 1A. The inner area of the support frame 22 corresponds essentially to the inner opening 10 and a gutter section is formed along the left and the right guide rail 6 and the front frame part 20 so that rain can drain through the front or back end of the respective guide rail 6. The support frame 22 can be configured such that the front frame part 20 and the middle frame part 21 are connected to the left and the right lengthwise part and that the guide rails 6 are connected to the left and the right part.

Instead of a sliding head liner 11 formed from a single plate, according to this embodiment a sun shade composed of linen or the like can be used and includes a length of cloth 23 which can be rolled on a roller shaft 24, the roller shaft 24 being attached behind an inner opening 10 and being supported on the left and the right guide rail 6. The length of cloth 23 on its front end includes a front extraction rod 25 movably supported on the left and right guide rail 6 in the lengthwise direction. The roller shaft 24 has a helical spring to apply a return force to the length 23 of fabric.

Figure 2A:
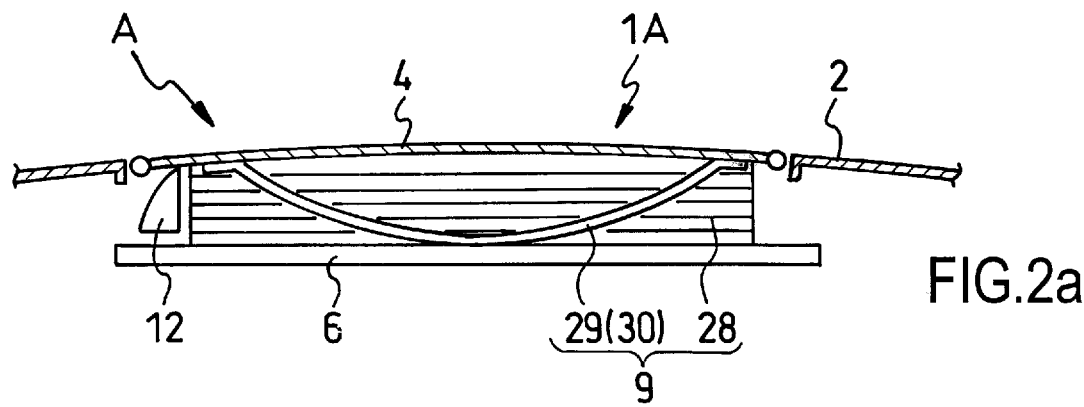
FIGS. 2 (a)–2(c) shows side views of the operation of a cover panel and the cover member of the sunroof according to the first embodiment of the invention.
Figure 2B:
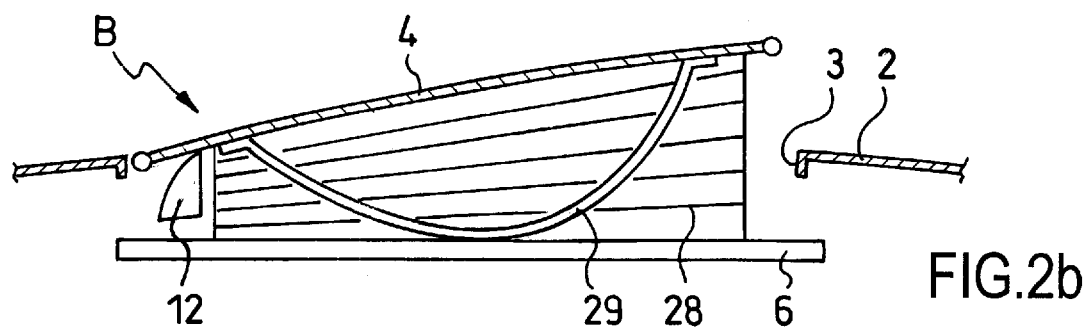
Figure 2C:
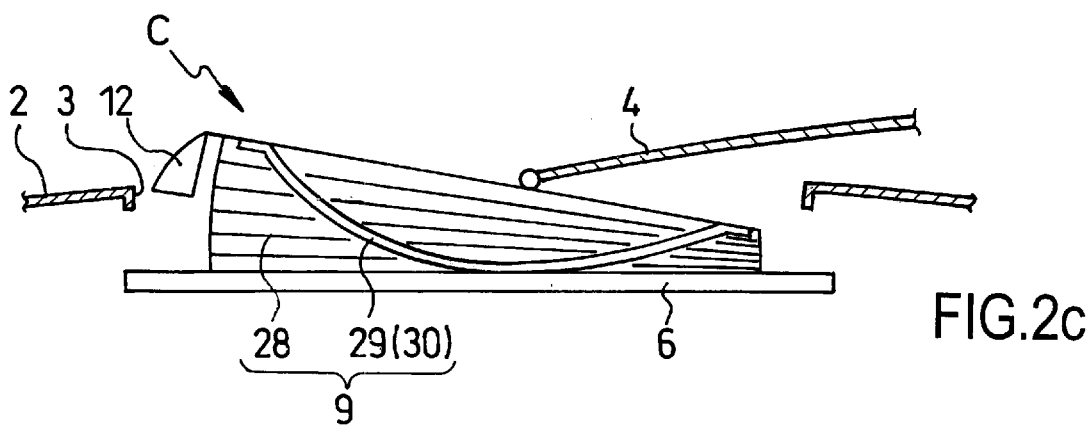
Figure 3:
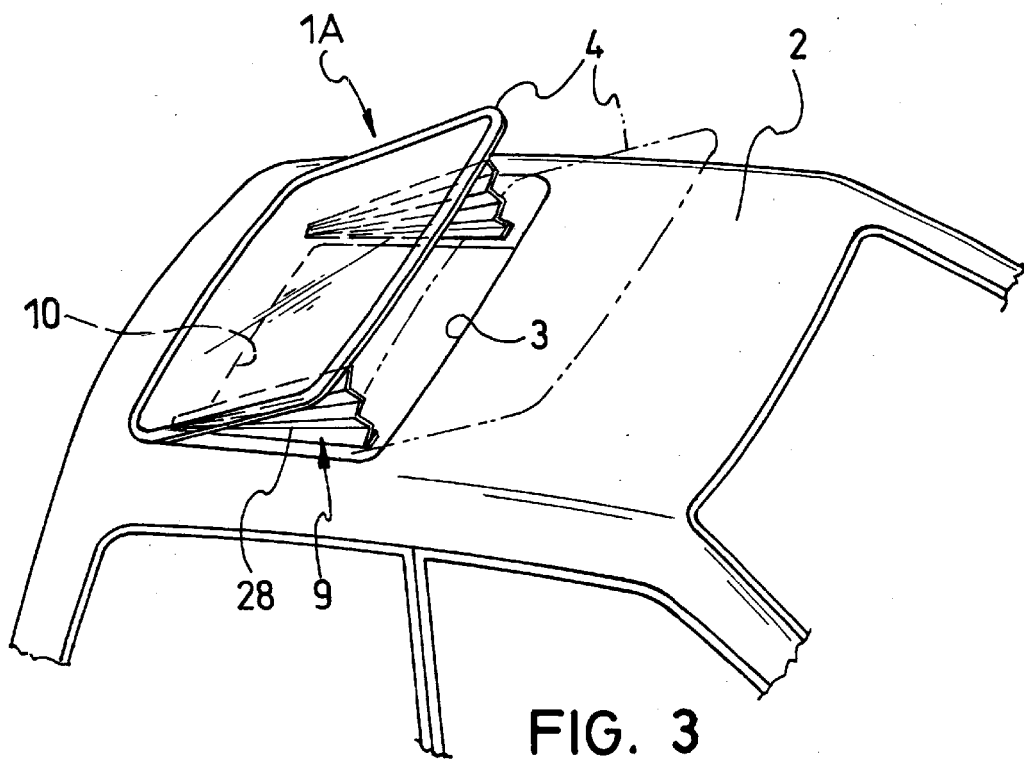
FIG. 3 shows in an top perspective view of the cover panel in a raised position according to the first embodiment of the invention.
Figure 4:
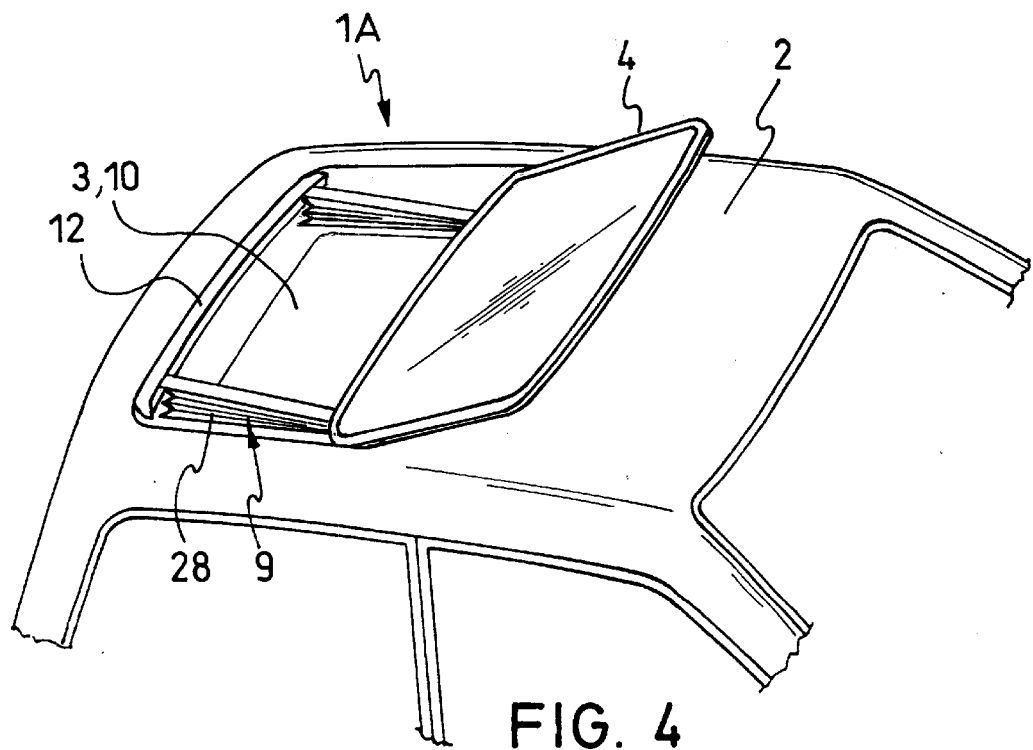
FIG. 4 shows in top perspective view the cover panel in a completely opened position according to the first embodiment of the invention.

As shown in FIGS. 2(a)–2(c), the cover member 9 is provided for preventing an air swirl from flowing into the motor vehicle interior through the inner opening 10 and prevents the drive 8 including the raising lever 5 of the slider 7 or the like from being visible from the motor vehicle interior when the cover panel 4 is in the raised position. The cover member 9 includes a shade 28 which can be vertically compressed or expanded using a tensioning or stretching means 29. The shade 28 is synchronized with the upward and downward motion of the cover panel 4. The wind deflector 12 is attached on the left and right end to the respective front section of the left and the right shade 28. The shade 28 can be composed of fabric, paper, plastic or the like and is shaped like an accordion or a bellows so that it can be vertically compressed or expanded. A lower section of the shade 28 is located on the top of the guide rail 6 on the side facing the inner opening 10, and the top of the top section of the shade 28 is brought into contact with the essentially horizontal section 5a of the raising lever 5. The shade 28 has plate parts or hardened sections for reinforcing the top and bottom section so that the bottom section can be attached to a component of the frame 22 which is not formed by the guide rail 6 and/or the top section of the cover member 28 can be brought directly into contact with the cover panel 4.

Figure 5:
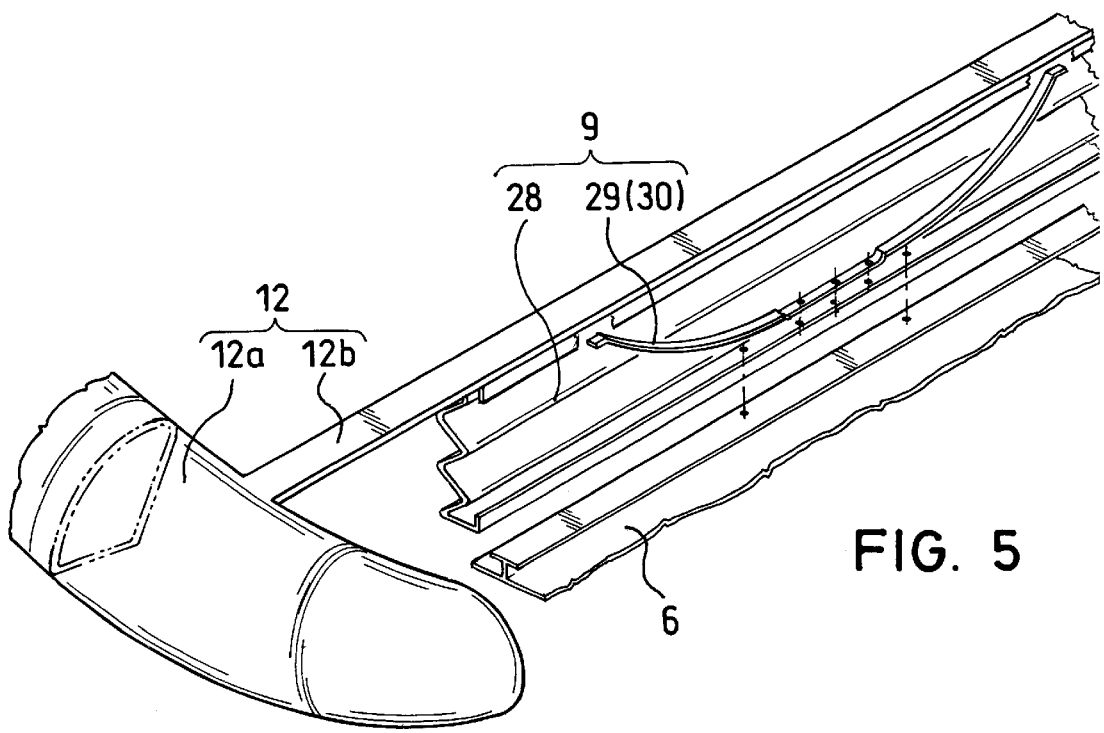
FIG. 5 shows in a perspective exploded view the cover member and a wind deflector.
Figure 6:
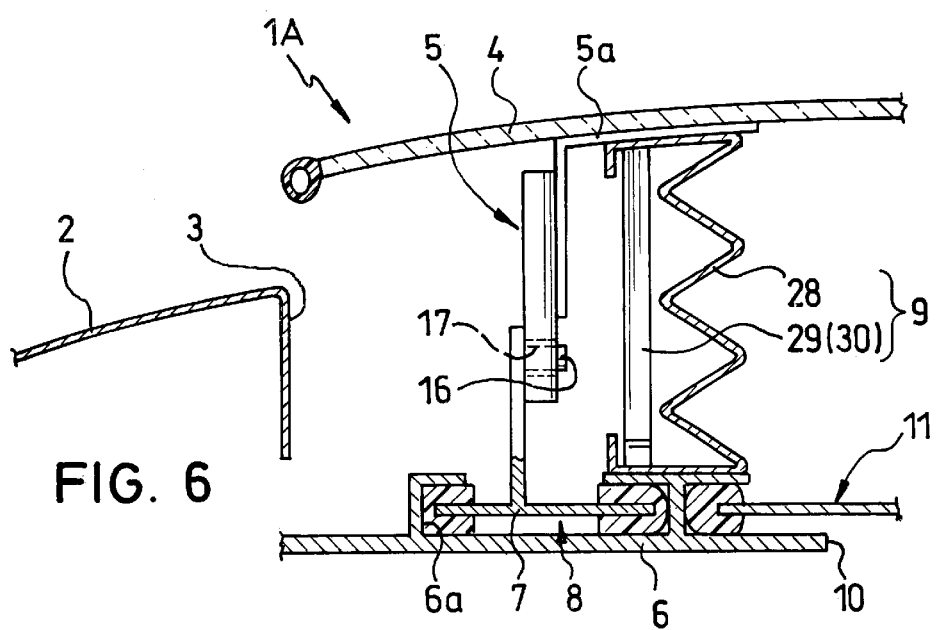
FIG. 6 shows in a side cross sectional view the cover member.

The stretching means 29 is made as a spring part 30 which may be formed in an arc-shaped or a substantially U-shape and which on its middle section is attached to the bottom section of the shade 28 or together with the shade 28 to the guide rail 6. The front and back end of the stretching means 29 are brought into contact with the bottom of the top section of the shade 28 so that the front end and the back end of the shade 28 are pretensioned to the top. As shown in FIG. 5, the wind deflector 12 includes a wind deflector base body 12a having a front surface with a shape which designed for deflecting the airstream, and a right and a left holding part 12b which are connected to the left and to the right end of the base body 12a and also attached to the top section of the shade 28 which is used as a bearing part or bearing arm for attachment of the wind deflector 12 to the frame 22 so that it can be vertically expanded relative to it.

As shown in FIGS. 1 and 2(a), the sunroof 1A is in a completely closed position in which the opening 3 is completely closed by the cover panel 4 and the pin 16 of the slider 7 is located on the front end of the crank slot 17. If the slider 7 is moved to the rear out of this position by actuation of the drive 8, the raising lever 5 is pivoted around a sliding block 15, by which its back end is raised as soon as the pin 16 is moved back along the crank slot 17, and finally the cover panel 4 is raised into its raised position which is shown in FIG. 1 with the solid line or in FIG. 2(b). The raising of the back end of the cover panel 4 enables ventilation of the vehicle interior and the cover panel 4 is raised if the top section of the contracted shade 28 which is in contact with the bottom of the cover panel 4 is also raised.

The shade 28 being connected to the cover panel 4 by the rear tensioning force of the spring element 30 so that the shade 28 is spread apart in the shape of a circle sector which opens backward. As a result, the shade 28 which is opened in the shape of a sector, air is prevented from flowing in through the gap between the solid roof 2 and the cover panel 4 and through the inner opening 10. At the same time the shade 28 is also used as an inner cover for covering the raising lever 5 and the slider 7 so that they are not visible from the interior of the vehicle since the shade 28 is located on the inside. When the slider 7 continues to be moved backwards from the position in which the cover panel 4 is completely raised, the pin 16 engages the back lower end of the crank slot 17 and it continues to be moved backward while it is being accompanied by the raising lever 5 in order to move the cover panel 4 to the rear into its completely opened position which is shown in FIG. 1 by a line with two dots and a dash or in FIG. 2(c). Since the shade 28 is attached to the side of the guide rail 6, it remains at this time stationary in its lengthwise position and only the cover panel 4 is moved to the rear with its raised back end, while its front end which is located in the lowermost position (or the front section of the raising lever 5) is kept in contact with the top of the top section of the shade 28.

While the cover panel 4 is being moved back, one contact point between the front end of the cover panel 4 and the top section of the shade 28 which has been converted into a sector shape which is flared to the rear is moved backwards and in this way the rear section of the shade 28 is compressed from its spread position into its compressed position. In this way the cover panel 4 can be moved to the rear. Since the contact point between the shade 28 and the cover panel 4 is moved back, at the same time the front section of the shade 28 which was initially compressed by the front end of the cover panel 4 can be stretched upward as a result of the tensioning force which is applied by the front end of the spring element 30 of the stretching means 29 so that the shade 28 is changed into a sector shape which is flared forward and at the same time the wind deflector 12 is raised on the front section of the opening 3. Consequently the top section of the shade 28 executes a pendulum motion in which the shade function or the spread shade section is displaced from back to front.

The wind deflector 12 in its raised position (as shown in FIG. 1 by the dotted line and a dash or in FIG. 2(c) smoothes the air flow streaming along the front surface of the solid roof 2 so that it is deflected upward and the air flow which could stream from the left and the right side of the wind deflector base body 12a into the opening 3 is prevented from flowing in by the shade 28 in its sector-shaped arrangement which is flared forward. The shade 28, which is located in its forward-flared sector shape, not only prevents air from flowing into the passenger compartment, but it also covers a clearly visible intermediate space between the opening 3 of the roof 2 and the inside opening 10 from the inside of the vehicle interior. To close the cover panel 4, the slider 7 is moved forward in the opposite sequence of motions relative to that sequence of motions which was described above when the cover panel 4 is opened.

Furthermore, the shade 11 can be opened or closed depending on whether the cover panel 4 is open or closed. Even if the sunroof 1A is an external lifting and sliding roof, or one which is guided to the outside, it can also be formed as an internal lifting and sliding roof or one which is guided to the inside, in which the cover panel 4 is pivoted upward out of its position which completely closes the opening 3, then is moved down and can be moved backward from its lowered position by some modifications being made, for example the one in which the crank slot 17 is made in a V-shape and the distance between the middle frame part 21 and the solid roof 2 is made larger. In this case the shade 28 and the wind deflector 12 can execute the same movements as described above. The sunroof 1A can also be converted without any modification into a spoiler-like sunroof in which the cover panel 4 is raised, but not moved backward.

As shown in FIGS. 7–9, in the second embodiment, a sunroof 1B does not have a wind deflector 12 and the spring element 30 of the stretching means 29 is attached on its front section to the bottom section of the shade 28 and on the rear section is in contact with the bottom of the top section of the shade 28. Each top section of the left and the right shade 28 is in contact with the bottom of the cover panel 4 on the inside of the left and right raising lever 5 and a bearing tongue is formed on the rear top section of the shade 28 and projects against the raising lever 5, and corresponding thereto a bearing section 41 is formed on the raising lever 5 which holds the bearing tongue 40 from the bottom. Thus, an auxiliary means 42 is formed from the bearing tongue 40 and the bearing section 41 which supports the raising motion.

Figure 9A:
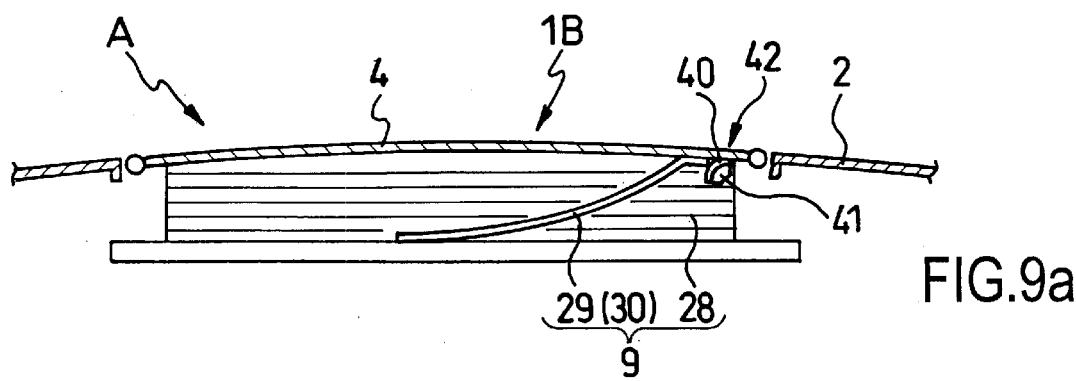
FIGS. 9(a)–9(c) shows side views of the operation of the cover panel and the cover member according to the second embodiment of the invention.
Figure 9B:
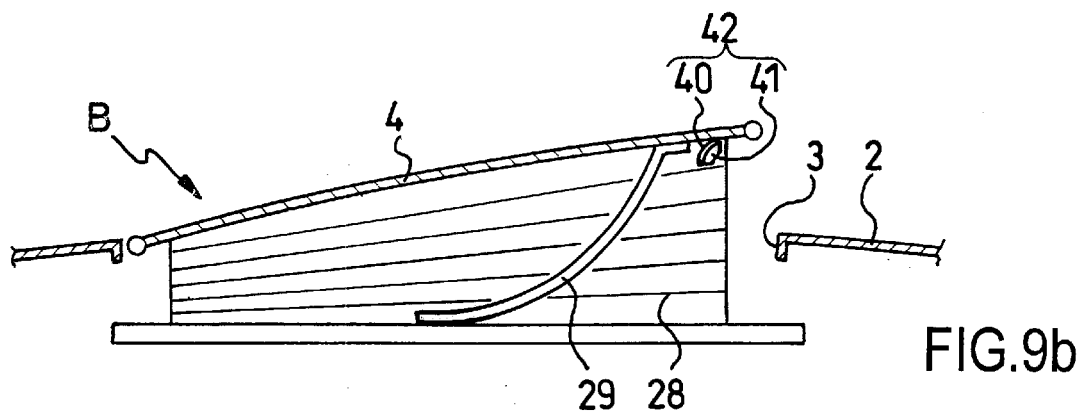
Figure 9C:
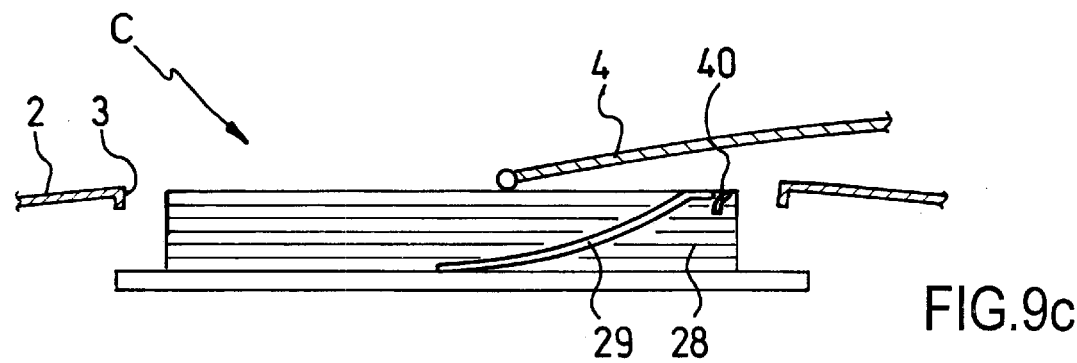

When the cover panel 4 is in its completely closed position (FIG. 9(a)) or in its raised position (FIG. 9(b)) the bearing section 41 of the raising lever 5 from the bottom engages the bearing tongue 40 of the shade 28 so that the rear section of the shade 28 follows the upward motion of the cover panel 4 to which it is coupled. In this way the shade 28, even if strong air swirls occur on the shade 29 when the cover panel 4 is in its raised position, can withstand the air swirls and retain its position. When the cover panel 4 is moved to the rear while it maintains its raised position, the bearing section 41 is separated from the bearing tongue 40 so that the rear section of the shade 28 can be pulled together. Since the shade 28 is pulled together when the cover panel 4 is moved to the rear, the shade 28 need not be supported on the rear top section (FIG. 9(c)).

Figure 11A:
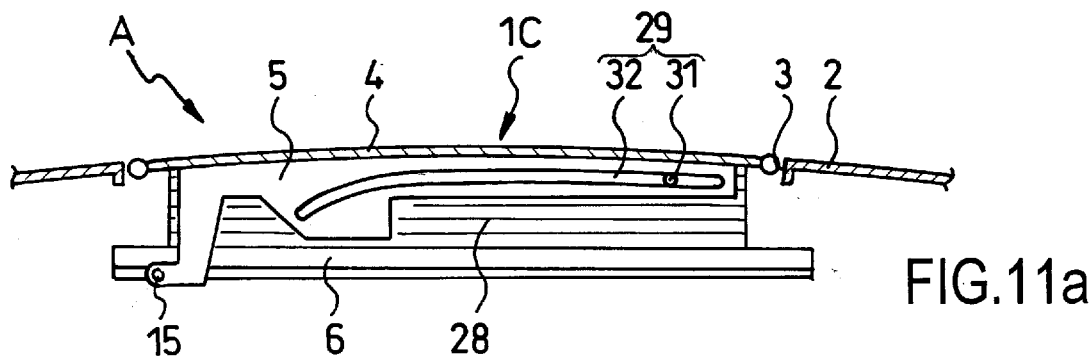
FIGS. 11(a)–11(c) shows side views of the operation of the cover panel and the cover member according to the third embodiment of this invention.
Figure 11B:
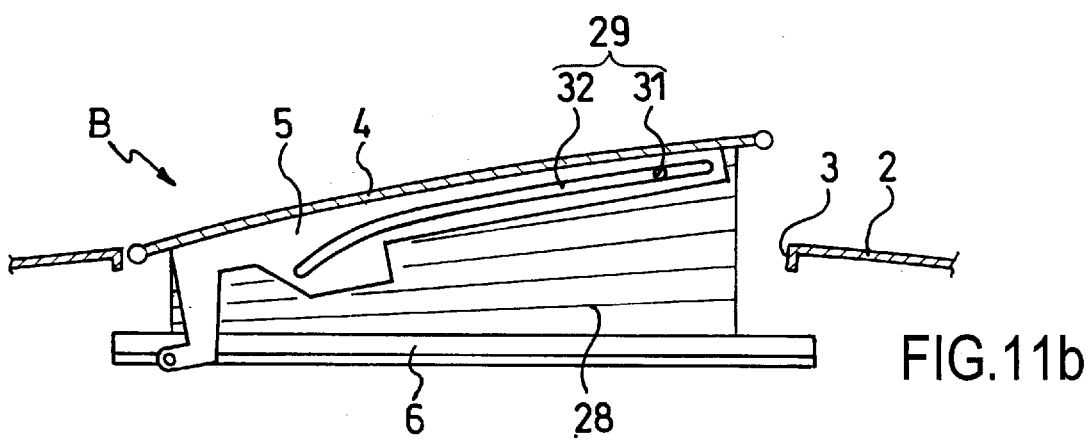
Figure 11C:
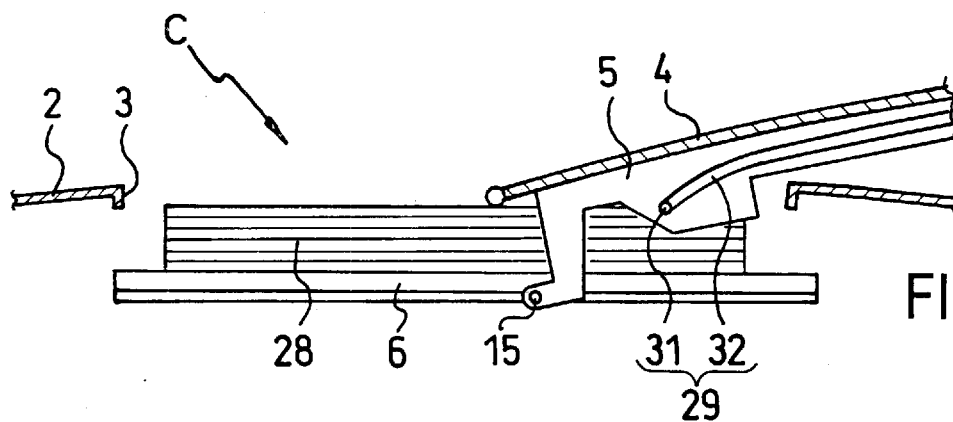
Figure 12:
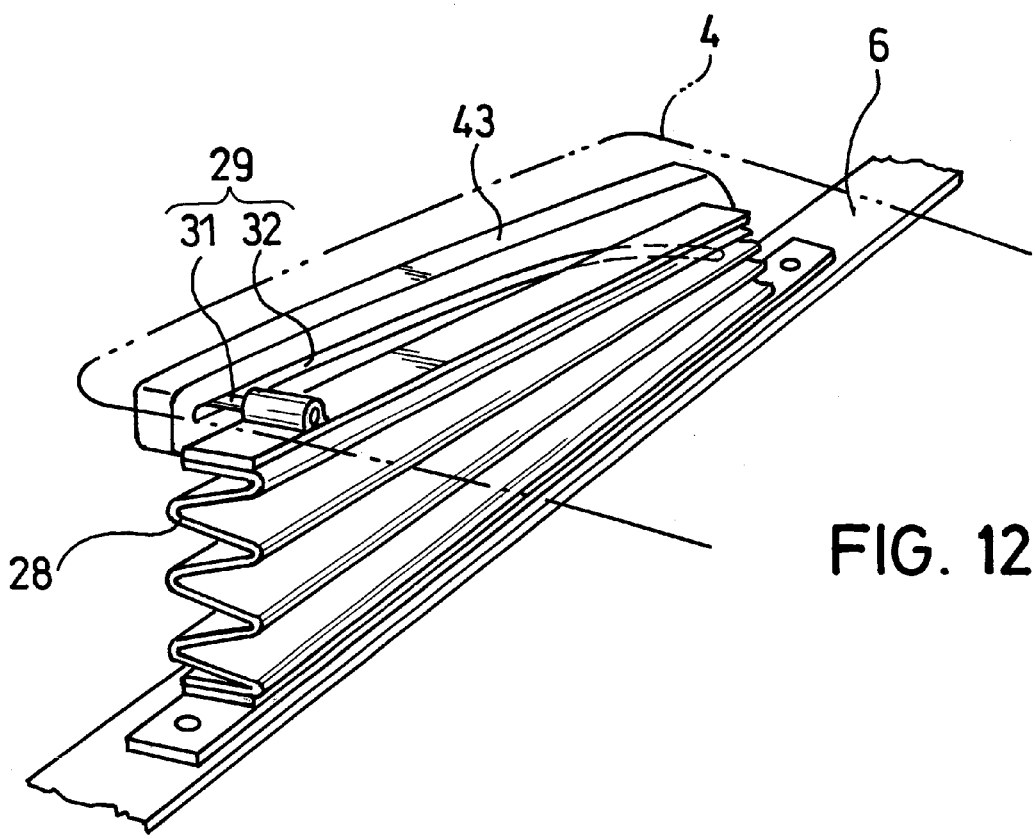
FIG. 12 shows in a perspective view the cover member and a stretching element.

As shown in FIGS. 10–12, a sunroof 1C in a third embodiment includes a stretching means 29 having an engagement element 31 which is provided on the back top section of the shade 28 and has a crank guide 32 which is made on the cover panel 4 or on the raising lever 5, and may also include a spring element 30. The engagement element 31 includes a pin which is inserted into the crank guide 32 and is in contact with the top and bottom of the crank guide 32, the crank guide 32 being formed by a slot on a strip part 43 which is mounted on the cover panel 4 or on the raising lever 5. Alternatively, the crank guide 32 can be formed directly on the raising lever 5. The crank guide 32 has a front section which is lowered towards the front.

When the cover panel 4 is raised out of its completely closed position in the sunroof 1C (FIG. 11(a)), the rear section of the shade 28, as a result of the engagement between the crank guide 32 and the engagement part or the pin 31, is raised so that the shade 28 is stretched into a sector shape which flares to the rear. When the cover panel 4 is moved to the rear out of its raised position (FIG. 11(b)), the engagement part 31 is moved by sliding relative to the crank guide 32 in it such that the cover panel 4 can be moved to the rear while the shade 28 remains stationary in its lengthwise position (FIG. 11(c)), but it is drawn together by controlling the vertical position of the engagement element 31 via the shape of the crank guide 32. The engagement part 31 on the back top section of the shade 28 is in contact with the top and the bottom of the crank guide 32 and is movably guided thereon, the top section of the shade 28 being kept in contact with the cover panel 4. Furthermore, the sunroof 1C of the third embodiment can be modified such that the spring element is mounted on the shade 28 and can pretension the rear top section upward and the crank guide 32 has only one surface which engages the engagement part 31 from the top, so that the shade 28 can be pulled apart only by the spring element and the compression motion can be controlled only by the crank guide 32.

Figure 13:
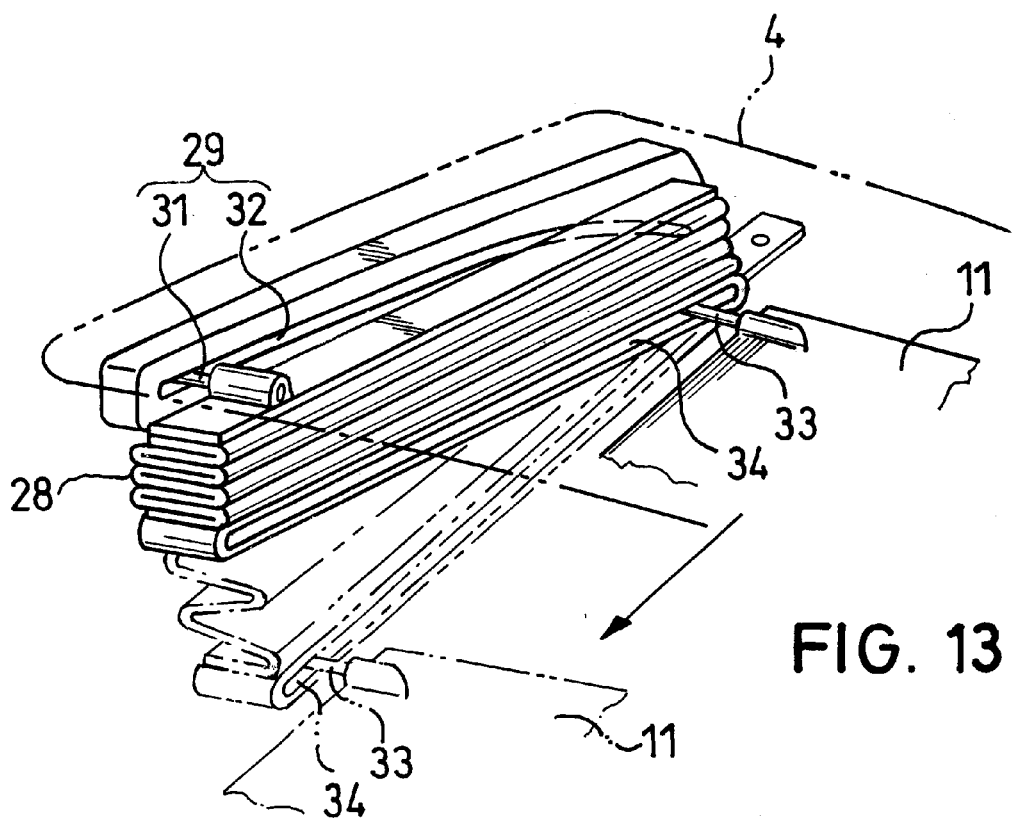
FIG. 13 shows in a perspective view a cover member and a stretching element according to a fourth embodiment of the invention.

The sunroof 1D of a fourth embodiment shown in FIGS. 13 and 14 is made such that the lower section of the shade 28 of the sunroof 1D can be controlled by way of the cover member 11. In the sunroof 1D, the shade 28 is kept stationary in the lengthwise direction and is supported to be able to pivot around a transverse axis on the front lower section so that the rear section can be raised, and an engagement slot 34 is formed over roughly the entire length of the bottom section of the shade 28 and engages an engagement projection 33 which is attached to the front bearing axis 25 of the cover member 11. Both the engagement projection 33 and also the engagement slot 34 are components of the stretching means 29. When the cover panel 4 is raised from its completely closed position (shown as a solid line in FIG. 13 or in FIG. 14(a) and 14(b)) while the cover member 11 is held in its closed position, the rear section of the shade 28 as a result of the engagement between the crank guide 32 and the engagement part 31 is raised. In doing so, the shade 28 on its rear section is raised in the state compressed over its entire length, and when the cover panel 4 is moved back from the raised position the engagement part 31 is pushed to the rear relative to the crank guide 32 so that the cover panel 4 can be moved to the rear, while the shade 28 remains stationary in its lengthwise position while the rear section of the shade 28 is pulled down by controlling the vertical position of the engagement part 31 by means of the shape of the crank guide 32.

Figure 14A:
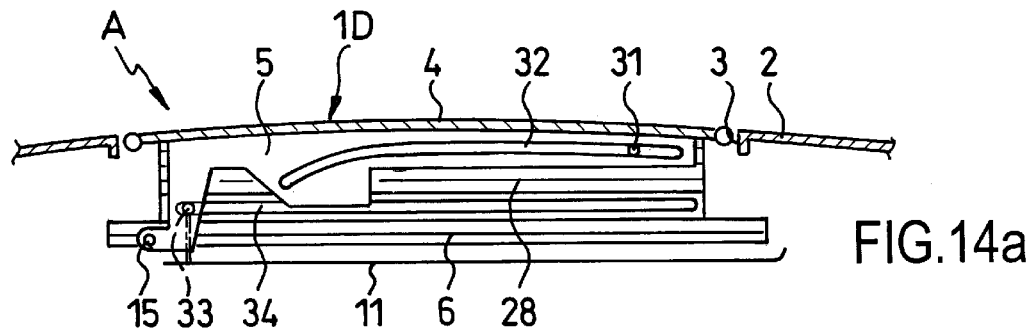
FIGS. 14(a)–14(d) shows side views of the operation of the cover panel and the cover member according to the fourth embodiment of this invention.
Figure 14B:
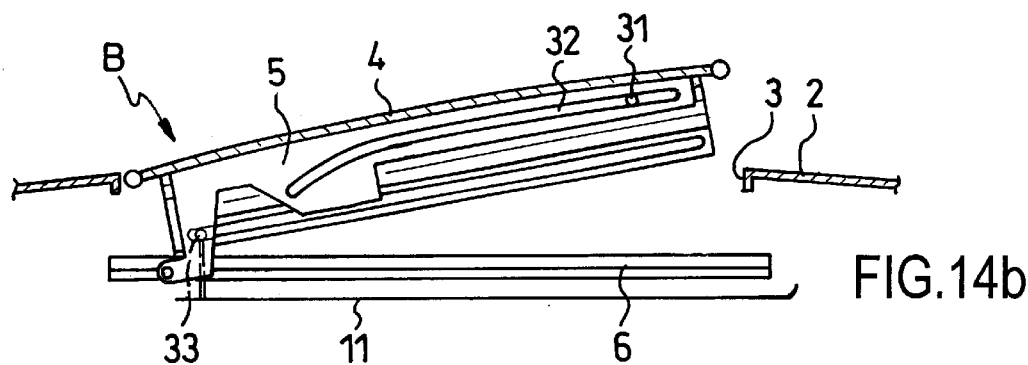
Figure 14C:
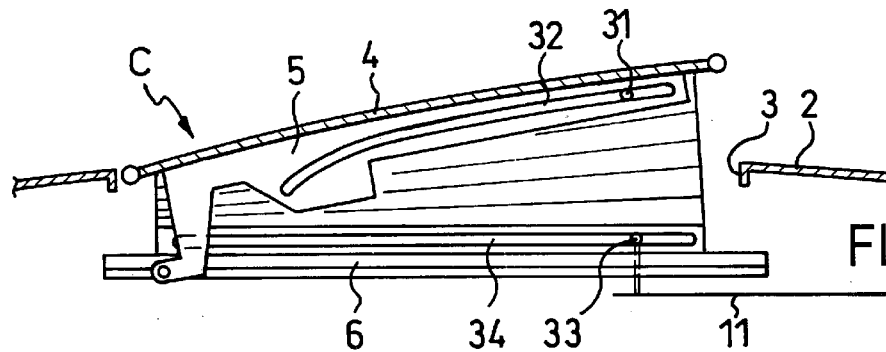
Figure 14D:
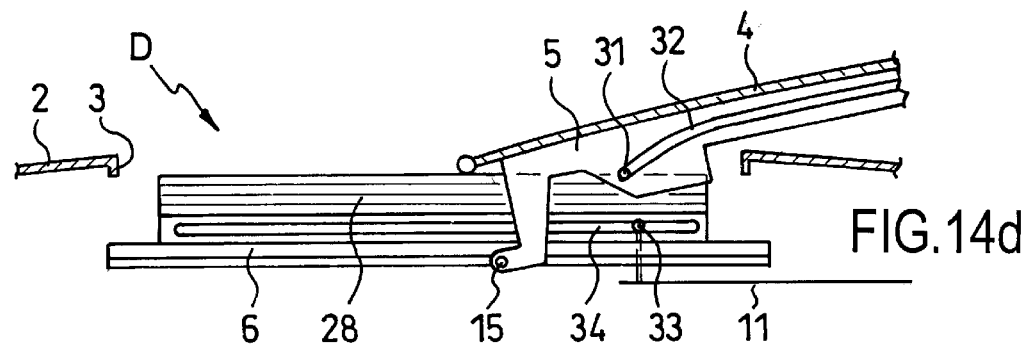

When the front bearing axis 25 is moved backwards to open the cover member 11, while the cover panel 4 is in its raised position (from the position in FIG. 14(b) to the position shown in FIG. 14(c)), the engagement projection 33 in the engagement slot 34 is moved while it retains a constant vertical position with respect to the guide rail 6, so that the bottom of the shade 28 is pulled rapidly down with its raised rear section such that it extends along the guide rail 6 in order to expand the shade 28 into a sector shape which flares to the rear. In the sunroof 1D, the shade 28 is made such that it is not pulled apart when the cover member 11 is closed since the shade function is not necessary under this condition, while the shade 28 is pulled apart in order to execute its own shade function when the cover member 11 is located between a slightly opened position and a completely opened position. When the cover panel 4 is raised, after the cover member 11 has been opened, i.e. after the engagement projection 33 has been moved back, the entire length of the lower section of the shade 28 is held stationary on the guide rail 6, and, similarly to each of the previous embodiments, the rear section of the shade 28 begins to pull apart with the initial raising of the cover panel 4.

Figure 16:
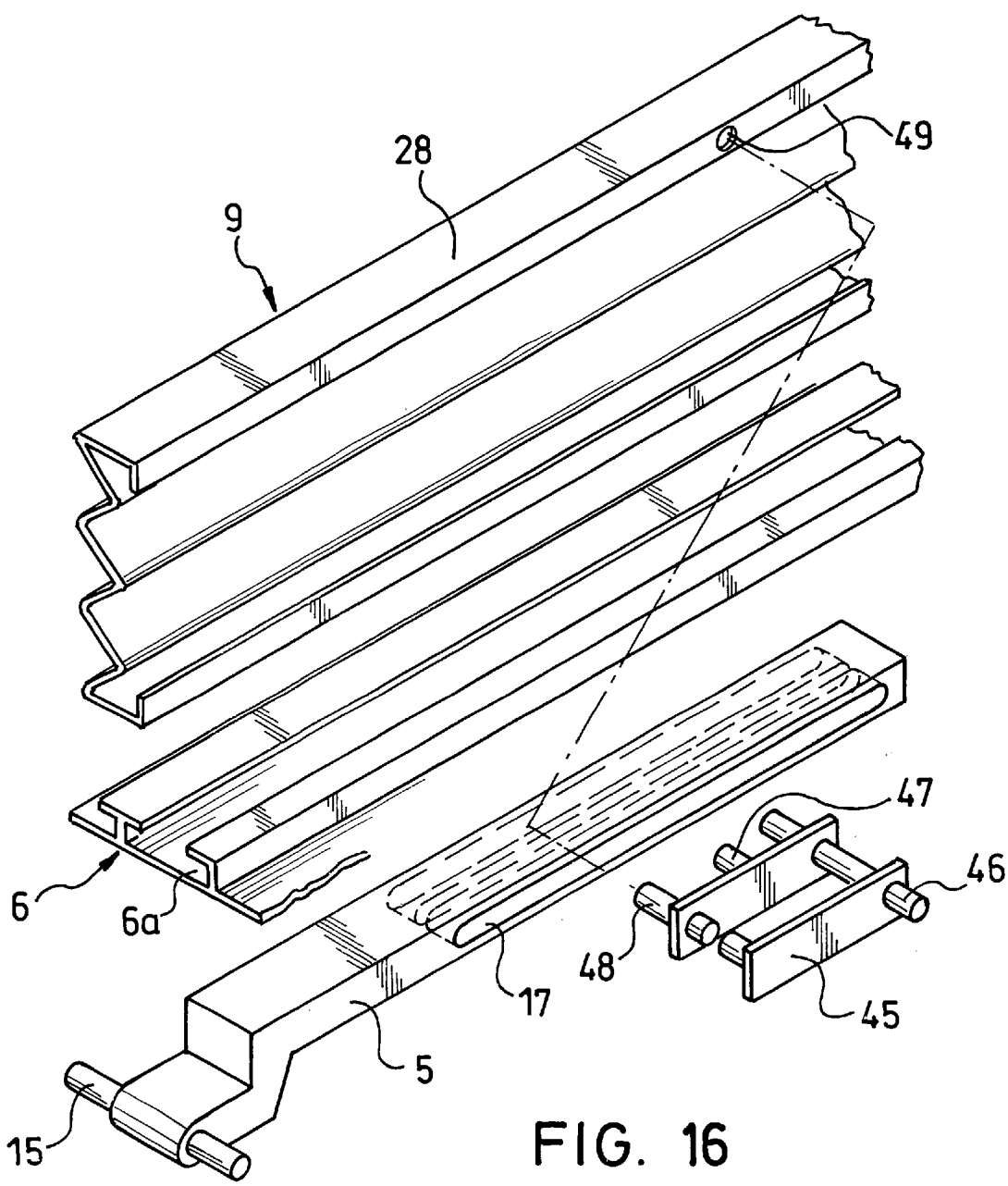
FIG. 16 shows in a perspective exploded view a raising lever and a cover member according to the fifth embodiment of the invention.
Figure 18:
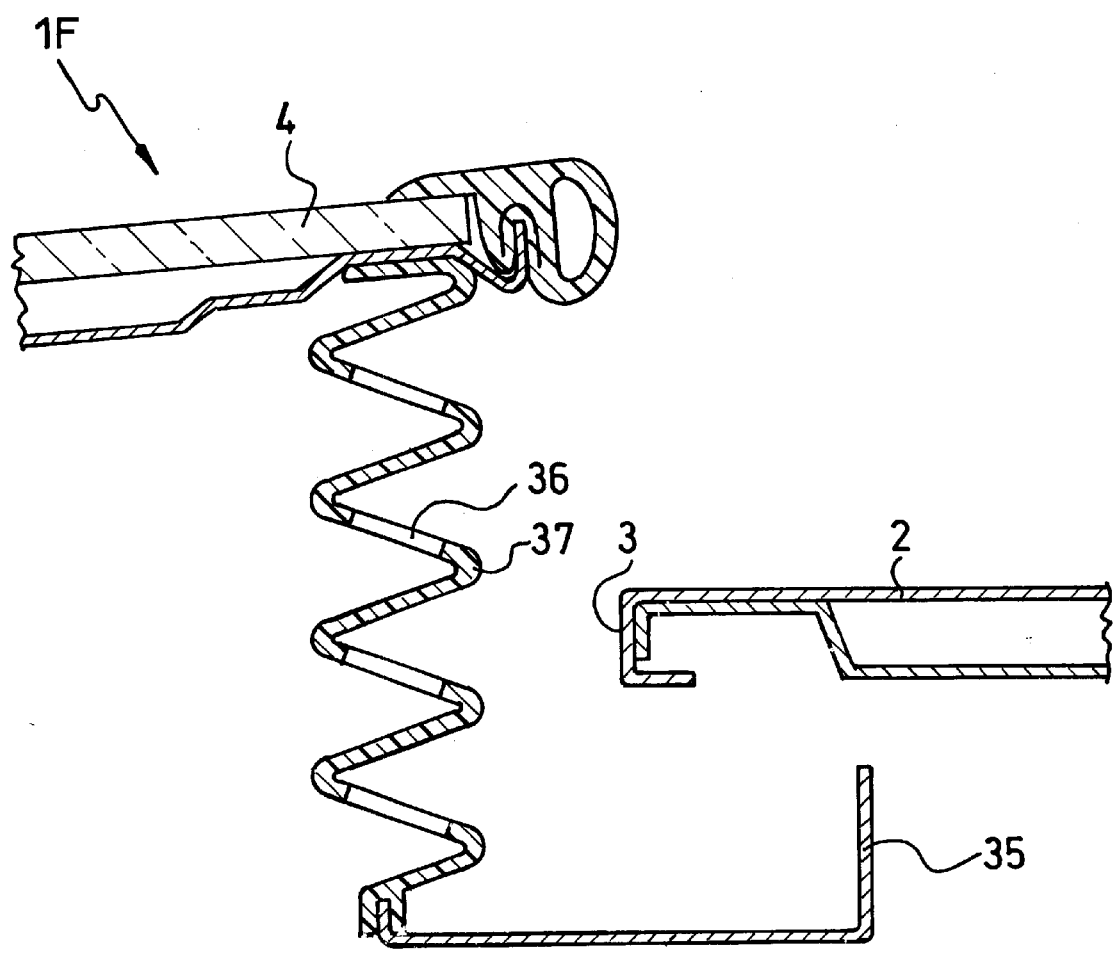
FIG. 18 shows in a cross sectional view the rear section of the sixth embodiment of this invention.
Figure 19:
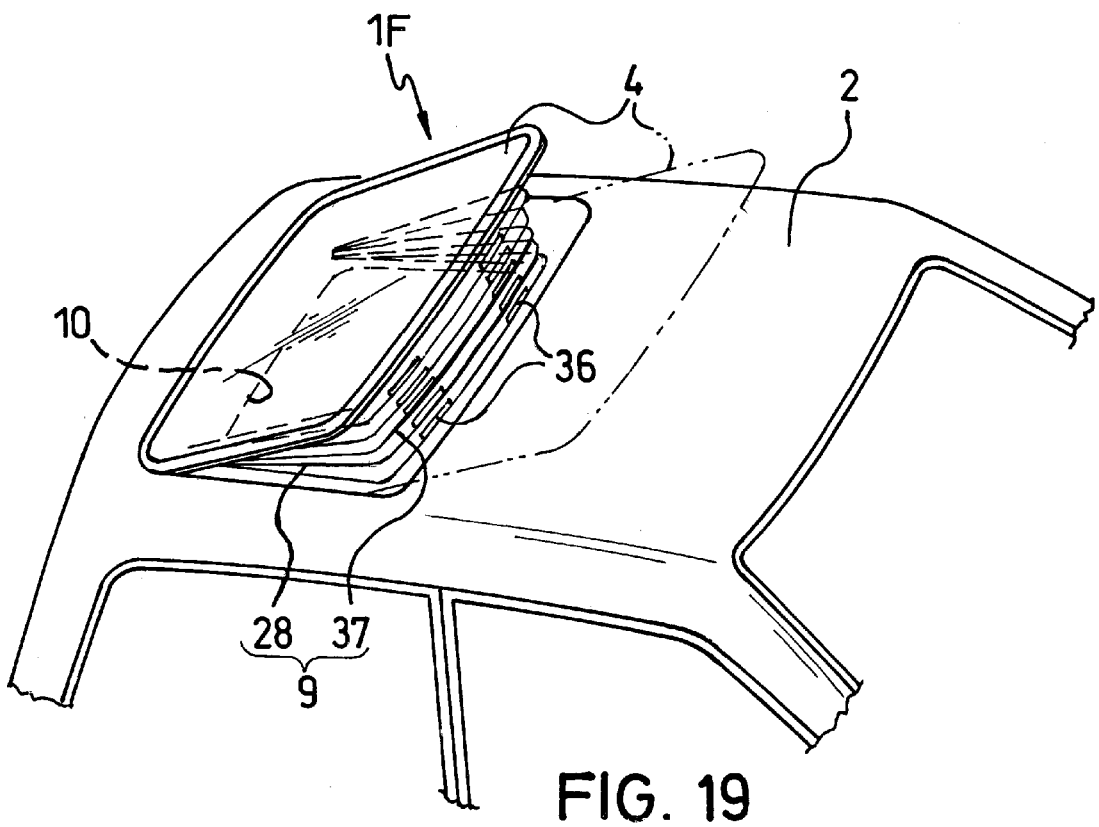
FIG. 19 shows in a top perspective view the motor vehicle roof in a raised position according to the sixth embodiment of this invention.
Figure 20:
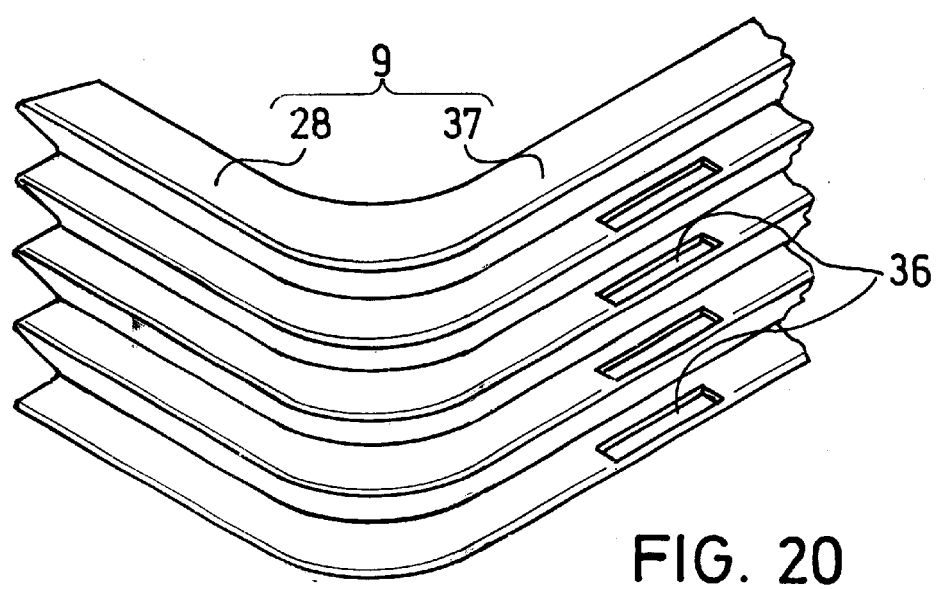
FIG. 20 shows in a perspective view the cover member according to the sixth embodiment of this invention.

The sunroof 1E of a fifth embodiment shown in FIGS. 15 and 16 differs from the sunroof of the second embodiment by its driver 8. The driver 8 of the sunroof 1E includes a lifting joint 45 between the raising lever 5 and the slider 7. The lifting joint 45 has three pins 46, 47, and 48, the two lower pins 46 and 47 each engaging the guide slots 7a and 7b, which are formed on the slider 7, and the upper pin 48 engaging a crank slot 17 which is formed on the raising lever 5, and with one opening 49 which is formed on the top section of the shade 28. Since the tensioning or stretching means 29 is configured such that it has a top pin 48 and an opening 49 instead of the engagement element 39 and the crank slot 17 instead of the crank guide 32, there need not necessarily be a spring element 30. Since the opening 49 of the shade 28 engages the upper pin 48, which in turn engages and is in contract with the crank slot 17, the top section of the shade 28 is in contact with the cover panel 4, by which relative sliding motion between the shade 28 and the cover panel 4 in the lengthwise direction is possible.

When the slider 7 is moved forward while the cover panel 4 is in its completely closed position, the lifting joint 45 rises up to lift the rear section of the cover panel 4 and to pull the shade 28 apart and when the raising lever 5 is moved to the rear while the cover panel 4 is kept in its raised position, the pin 48 is moved relative to the crank slot 17 and guided by it and the cover panel 4 is moved to the rear while the shade 28 remains stationary in the lengthwise direction and at the same time the lifting joint 45 is lowered to pull together the rear section of the shade 28. In a manner comparable to the first embodiment the second to the fifth embodiments can be configured also as an internally guided sliding and lifting roof by modification of the driver 8.

The sunroof 1F of a sixth embodiment shown in FIGS. 17–20 differs from the sunroof of the second embodiment by the cover member 9, which includes a gutter 35 as the water-receiving support part above the middle frame part 21. The cover member 9 contains not only the left and the right shade 28, but also a rear shade 37 with a lower section attached to the front section of the gutter 35, with a top section adjacent to the cover panel 4, and with a middle section which has at least one ventilation opening 36 formed therein. Even if the rear shade 37 can be produced separately from the left and the right shade 28 and can be connected to it, the rear shade 37 of this embodiment is formed integrally with them by bending a single layer of the vertical bellows part roughly in a C shape (in an overhead view) and by at least one ventilation opening 36 being formed on the back. Finally, the rear shade 37 is connected to the left and right shade 28.

The cover member 9 also has a rear shade 37, which makes it possible for the cover panel 4 to be moved to the front or rear as in the above described first to fifth embodiments, and it ensures ventilation of the vehicle interior when the cover panel 4 is in its raised position and as a result of the rear shade 37 it furthermore prevents rain which drips from the solid roof 2 onto the gutter 35 from spraying into the inner opening 10. Since the top end of the rear shade 37 is located above the surface of solid roof 2, when the cover panel 4 is raised the spray water stopping function of the rear shade 37 compared to the conventional shade is improved, in which there is a rib-shaped spray water stopping means on the front section of the gutter 35.

When the cover panel 4 is an externally guided lifting and sliding roof, the gutter 35 is attached to the guide rail 6 or to the bottom of the solid roof 2 while in the case of the internally guided lifting and sliding roof, the gutter 35 is supported on the guide rail 6 so that it can be moved forward and backward by the slider 7. The bottom section of the rear shade 37 can be attached to a bearing part, for example a clamp, which can be attached by the frame 22, the solid roof 2 or the roller protective part of the linen 23 of the cover member 11 in a position in which the rear section of the cover panel 4 is located in its completely closed position, and in this case, when the gutter 35 is provided separately, the middle section of the rear shade 37 can be arranged adjacent to the front top of the gutter 35 so that the rain is prevented from spraying into the vehicle interior. When the rear shade 37 is made integral with the left and the right shade 28 and is connected on its lower section to the frame 22, the shade 28 has a higher strength.

In accordance with the present invention, if the cover panel 4 is raised by the raising lever 5, the bellows-like shade 28 is pulled apart by the stretching means 29 and in doing so the shade 28 conceals the driver 8 and is therefore used as protection against an air draft from the outside so that an air draft cannot penetrate into the passenger compartment. When the cover panel 4 is pushed back, the shade 28 is pushed together, but it remains in its lengthwise position in order to retain a certain degree of the protective function, and finally this system can be used not only for inner or internally guided sliding and lifting grooves, but also for outer or externally guided sliding and lifting grooves.

Figures 21A, 21B, 21C:
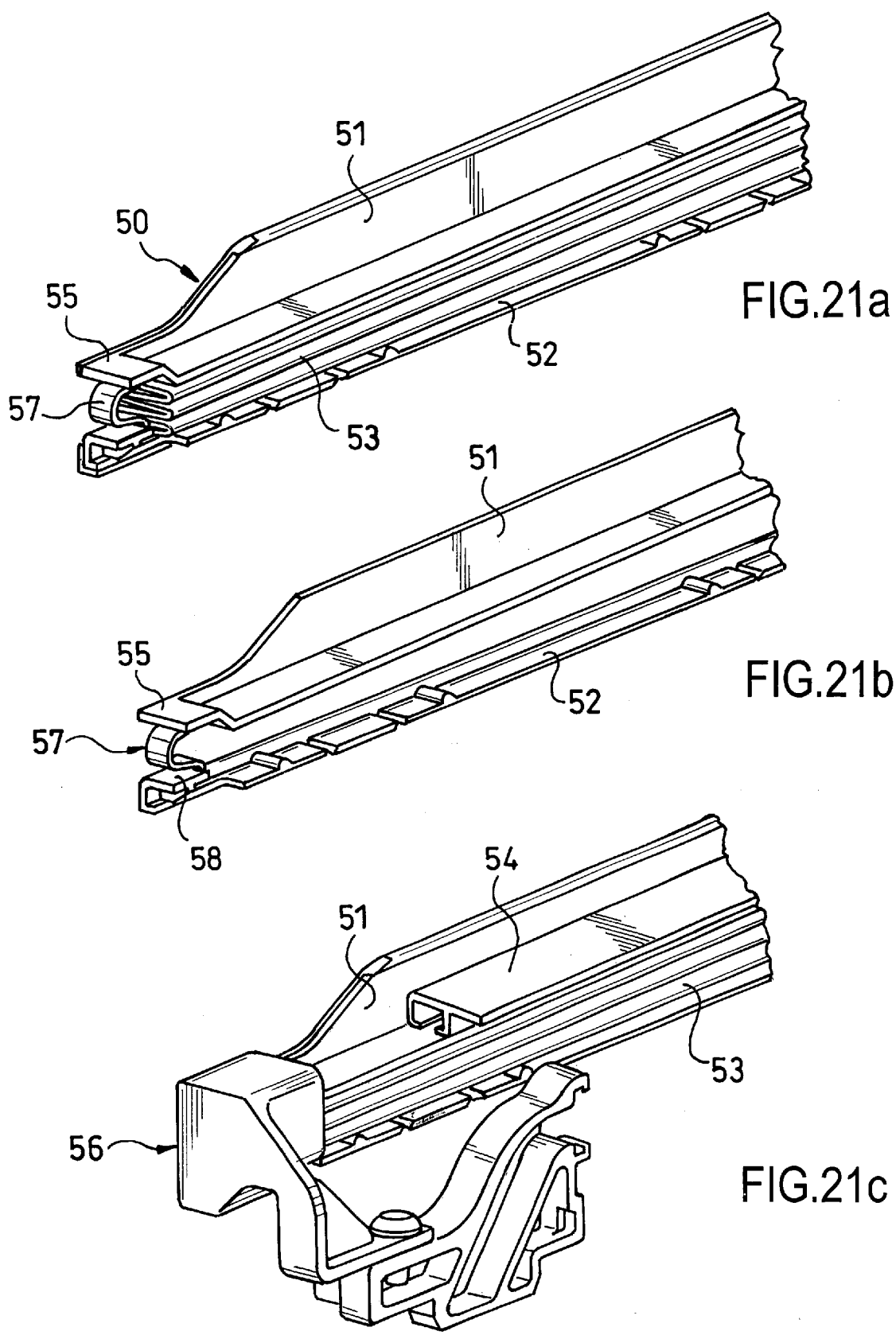
FIG. 21(a)–21(c) shows perspective views of another embodiment of the shade.
Figure 22:
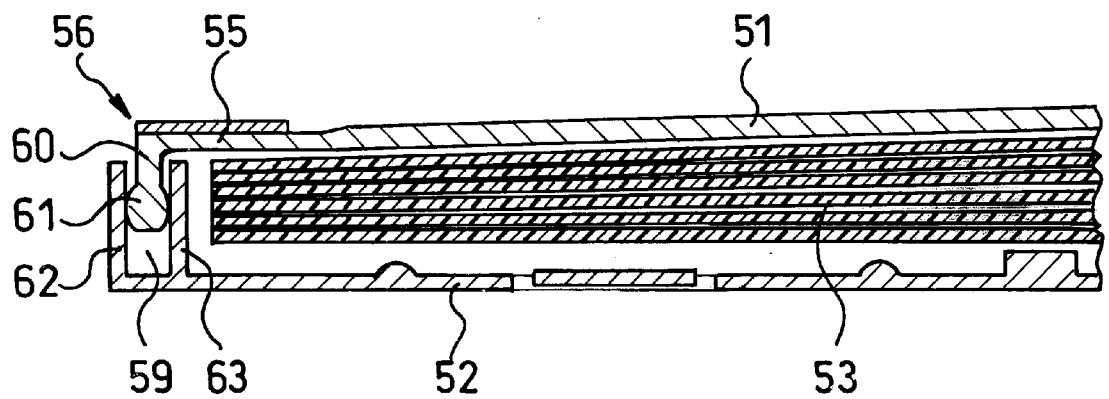
FIG. 22 shows in a side sectional view an embodiment of a shade.

As shown in FIGS. 21 and 22, in another embodiment of the invention which is a modification of the first embodiment, a shade arrangement 50 having a top part 51, a bottom part 52, and a bellows 53 located between the top 51 and bottom 52 parts (see FIG. 21(a)) and is permanently connected to the top part 51 and the bottom part 52 of the shade. The bottom part 52 of the shade is securely mounted on a section of the solid roof 2, for example, the guide rail 6 or a roof frame. The top part 51 of the shade is supported for movement lengthwise on a guide rail 54, the guide rail 54 being mounted on the cover panel 4 (see FIG. 21(c)). The top part 51 of the shade on its front end 55 is supported in a roof-mounted bearing 56 (see FIG. 21(c)) such that in the vertical direction it can be moved over a fixed compensation path to execute matching motion in the vertical direction when the cover panel 4 is raised. The front end 55 of the top part 51 of the shade is pretensioned upward by a spring 57. The spring 57 can be formed as a bent leaf spring which flexibly connects the front end 55 of the top part 51 of the shade to the front end 58 of the bottom part 52 of the shade (see FIG. 21(b)).

FIG. 22 shows an embodiment in which the bearing 56 has a receiving space 59 which is opened to the top for the holding part 60 which projects downward from the front end 55 of the top part 51 of the shade. The holding part 60 contains a thickened holding head 61 which is securely held between the two walls 62 and 63 of the bearing 56 in the lengthwise direction, but can moved in the vertical direction within a fixed path. Furthermore, the holding head 61 can be pivoted around the transverse axis (perpendicular to the plane of the figure) in order to enable matching motion of the top part 51 of the shade in this way.

FIGS. 23(a)–(c) show an embodiment of a shade 64 shaped as an accordion or fan with a top part 65 which can be moved to the top and a roof-mounted bottom part 66. The top part 65 of the shade 64 contains a rigid upper edge which is pressed by a spring means 67 with at least one spring against the bottom of the cover panel 4. When the raised cover panel 4 is pushed to the rear it slides along the top part 65 of the shade 64. The top part 65 of the shade 64 can be pivoted in its front end 68 and is movably supported by a fixed path in the vertical direction so that when the cover panel 4 is raised it can execute the required matching motion and thus adjoins the bottom of the cover panel 4 over its entire length. The front support of the top part 65 of the shade 64 is formed as a vertical slot 69 in the top part 65 in which a roof-mounted journal 70 is held.

Figure 24:
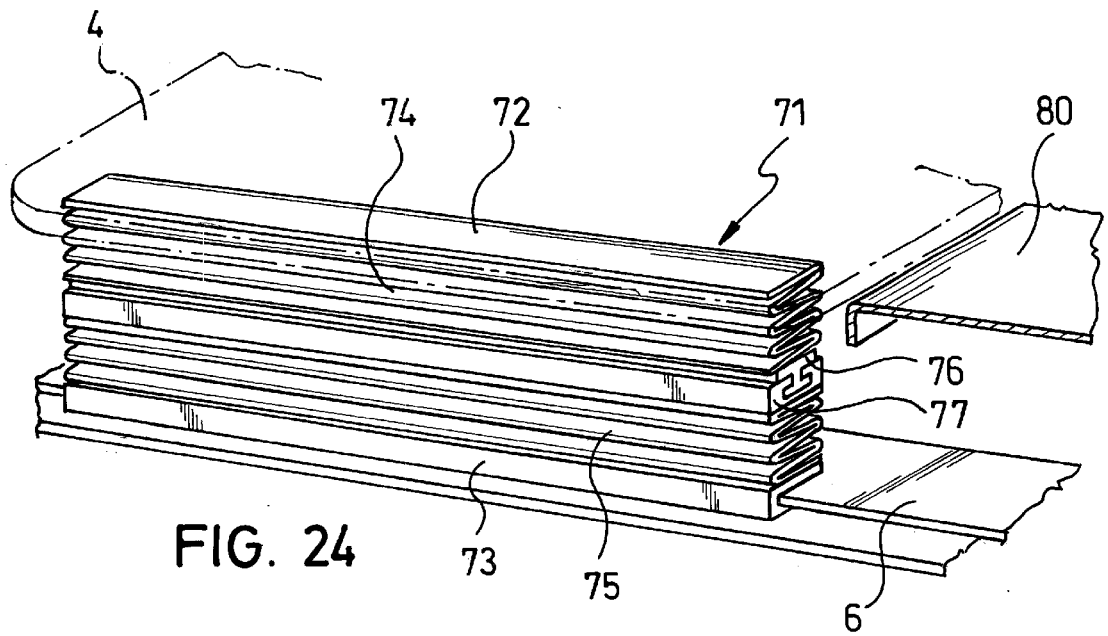
FIG. 24 shows in a side overhead view another embodiment of a shade for a vertically-pivotable and horizontally-movable sunroof in the closed position of the cover panel.
Figure 25:
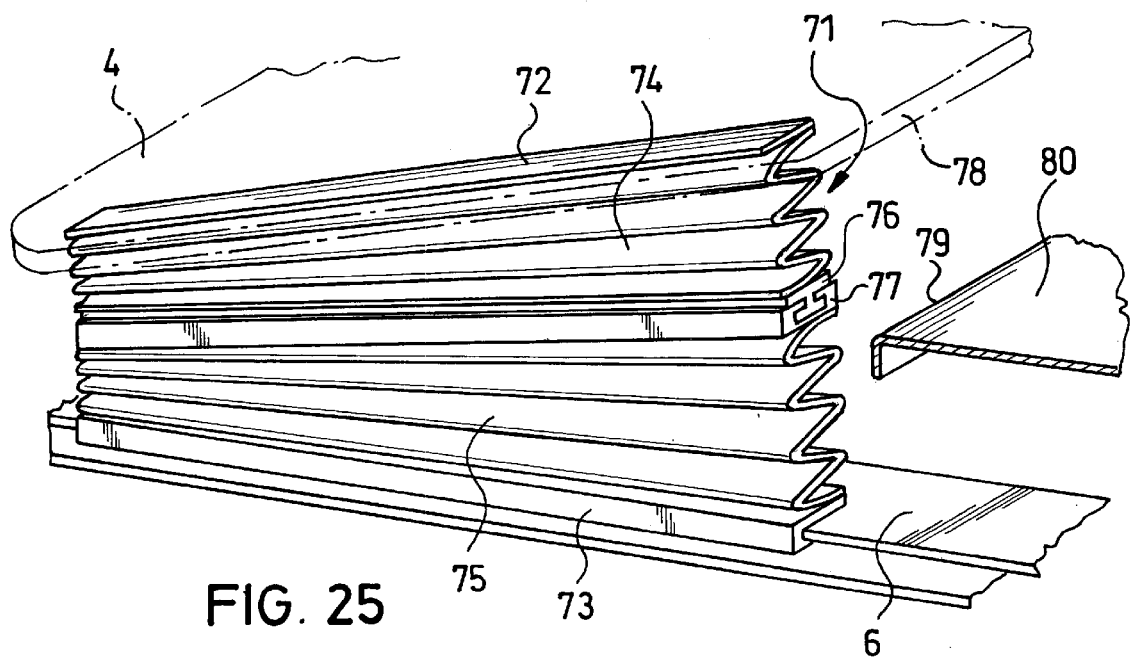
FIG. 25 shows in a side overhead view the shade shown in FIG. 24 with the cover panel raised.
Figure 26:
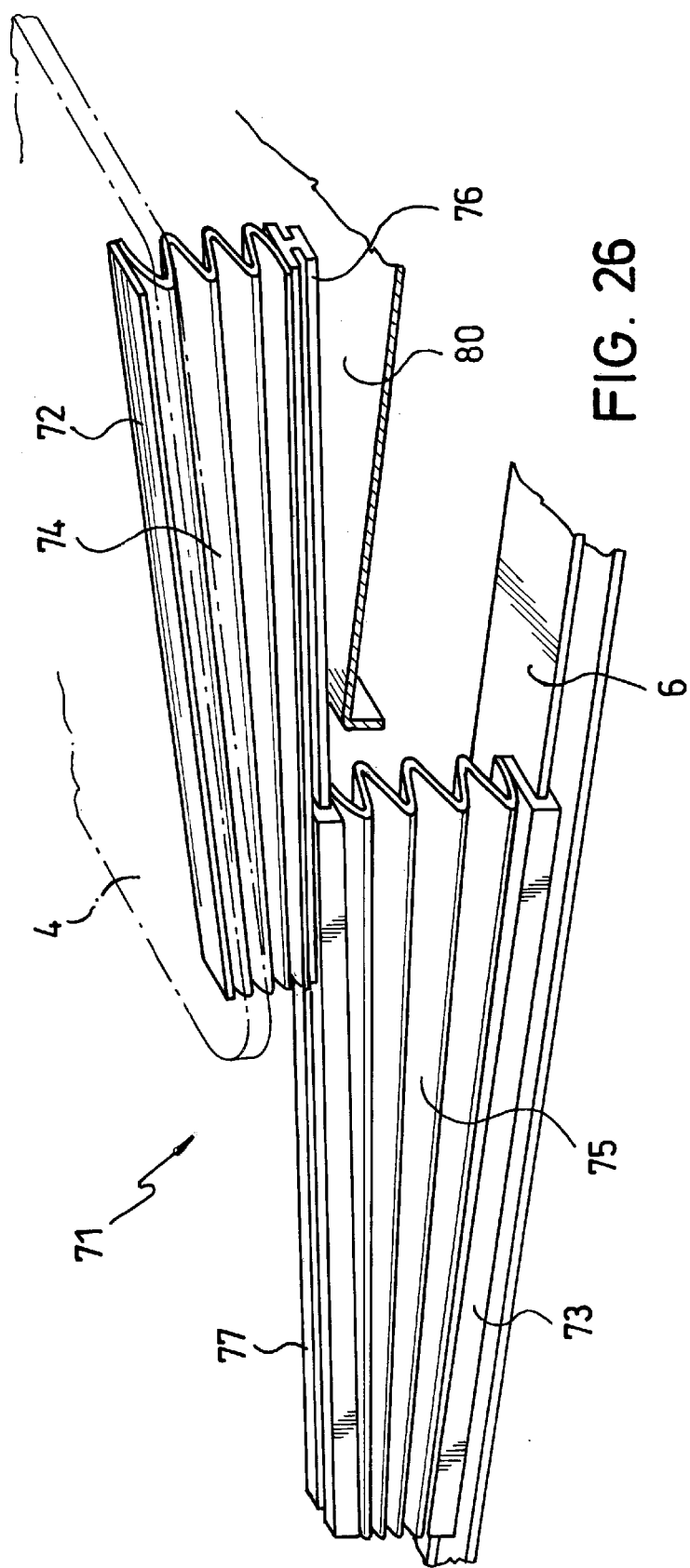
FIG. 26 shows in a side overhead view the shade shown in FIG. 24 with the cover panel raised and pushed to the rear.

As shown in FIGS. 24–26, In another embodiment, the sunroof contains a split shade 71 with a top part 72 and a bottom part 73 each having a top bellows part 74 and a bottom bellows part 75. The top and the bottom bellows part 74, 75 are connected to one another to be able to move lengthwise, for example via two rails 76, 77 which are guided on one another and which are made or mounted on the top and the bottom bellows part 74, 75. The top part 72 of the shade and the bottom part 73 of the shade are securely mounted on the cover panel 4 or the roof-mounted guide rail 6. As shown in FIG. 25, when the cover panel 4 is raised the two elastically-compressed bellows parts 74, 75 on the rear edge 78 of the cover panel 4, expand as a result of their tensioning force such that the two rails 76, 77 which are connected to one another are raised over the front edge 79 of the rear roof skin 80. When the cover panel 4 is moved to the rear in its raised position (FIG. 26), it entrains the upper bellows part 74, its lower edge or the rail 76 which is formed thereon being pushed to the rear guided on the rail 77 of the lower bellows part 75.

The rear roof skin 80 can also be the second cover of the roof 2. The bellows parts 74, 75 are preferably made of a spring-elastic material such as rubber or plastic. Preferably, the rails 76, 77 can be integrally made by injection onto the lower bellows part 73 or the upper bellows part 74. By way of the elastic tension of the material, the two bellows parts 73, 74 execute a uniform raising motion. A mechanism for raising the two rails which are supported on one another with the cover panel 4 raised is not necessary.

The shade can be an accordion-type or fan-type shade and can be made of fabric or another material without spring-elastic properties. In this case there is a means for lifting and raising the two rails which are supported on one another, for example a mechanism which is entrained when the cover panel 4 is raised. It is noted that this invention is not limited to the described embodiments, but can be changed and modified. For example the combination of the respective sections of the various embodiment can be changed and a teflon strip can be attached to a slide contact surface between the cover panel 4 and the shade 28 in order to reduce the frictional resistance.

We claim:

1. A sunroof for a motor vehicle having a roof with an opening, said sunroof comprising:
   a cover panel for opening and closing the opening;
   a left guide rail and a right guide rail for supporting said cover panel;
   drive means for moving said cover panel in at least one of a vertical and horizontal manner relative to the roof to place said cover panel in at least one of an opened position and a closed position; and
   cover member for covering said drive means when said cover panel is placed in said opened position and thereby prevent air from flowing into the motor vehicle,
   wherein said cover member is mounted such that in operation it is vertically compressed and expanded, and is fixed with respect to a respective guide rail in a lengthwise direction and said cover panel is mounted such that it can be moved in a lengthwise direction with respect to said cover member.

2. The sunroof as claimed in claim 1, further comprising a left raising lever and a right raising lever connected to said cover panel, said left raising lever and said right raising lever each having a front section which is respectfully pivotally mounted on said left guide rail and said right guide rail in a lengthwise direction.

3. The sunroof as claimed in claim 2, wherein in operation said drive means operates so as to vertically and horizontally move said left raising lever and said right raising lever with respect to said left guide rail and said right guide rail.

4. The sunroof as claimed in claim 3, wherein the cover member includes a shade which operates so as to expand in a vertical direction with respect to said cover panel, said shade having a bottom section which is rigidly attached to each of said left guide rail and said right guide rail so as not to move in a lengthwise direction with respect to said cover panel.

5. The sunroof as claimed in claim 4, further comprising stretching means for moving a top section of said shade into contact with said cover panel in a manner such that said shade in operation is moved relative to said cover panel in a lengthwise direction with respect to said cover panel.

6. The sunroof as claimed in claim 5, wherein the stretching means moves the top section of the shade into contact with said cover panel even in cases in which said cover panel is in a raised position.

7. The sunroof as claimed in claim 2, wherein said cover member is formed as a bellows.

8. The sunroof as claimed in claim 1, wherein said cover member includes a spring device for pressing a rear top section of cover member against said cover panel.

9. The sunroof as claimed in claim 8, wherein said cover member includes an engagement element mounted on said rear top section of said shade, and wherein said cover panel is provided with a crank guide for engaging said engagement element when said cover panel is moved into said opened position.

10. The sunroof as claimed in claim 9, wherein during operation said engagement element is raised when said cover panel is placed into a raised position, and wherein said engagement element is lowered when said cover panel is placed into said closed position.

11. The sunroof as claimed in claim 1, further comprising a sun shade for closing the opening of the roof, said sun shade having an engagement projection and a front section being movably supported on said left guide rail and said right guide rail in a lengthwise direction relative to said cover panel, and wherein said cover member is supported to swivel around said engagement projection.

12. The sunroof as claimed in claim 11, wherein said cover member on a bottom section includes an engagement slot which is engaged by said engagement projection so as to move said shade in a lengthwise direction with respect to said cover panel.

13. The sunroof as claimed in claim 1, further comprising a holding device mounted underneath said cover panel at a point which corresponds to a rear section of said cover panel when said cover panel is in said closed position.

14. The sunroof as claimed in claim 13, further comprising a rear shade attached on a bottom end to said holding device, said cover panel being movable relative to said holding device, wherein said rear shade has a top end located proximal to said cover panel and includes at least one ventilation opening.

15. The sunroof as claimed in claim 14, wherein said rear shade is formed integrally with side shades mounted to a left and a right section of said rear shade.

16. The sunroof as claimed in claim 4, wherein said shade includes said bottom section of said shade fixedly attached to the roof and a top section movably supported on said cover panel.

17. The sunroof as claimed in claim 16, wherein said top section is supported on a front end by a bearing means mounted on the roof, said bearing means in operation allowing said front end to move vertically.

18. The sunroof as claimed in claim 17, wherein said top section includes a holding device which is supported in a receiver of said bearing means.

19. The sunroof as claimed in claim 18, wherein said bottom section includes a first front end section connected to a second front end section of the top section via an elastic device.

20. The sunroof as claimed in claim 1, wherein said drive means moves said cover panel such that said cover panel is raised from said closed position and horizontally moved with respect to the roof into said opened position.

21. A sunroof for a motor vehicle having a roof with an opening, said sunroof comprising:

a cover panel for opening and closing the opening;

a pair of guide rails for supporting said cover panel;

drive means for moving said cover panel in at least one of a vertical and horizontal manner relative to the opening to place said cover panel in at least one of an opened position and a closed position; and a cover member for covering said drive means when said cover panel is placed in an open position and thereby prevent air from flowing into the motor vehicle, wherein said cover member includes a top section and a bottom section which are connected to one another and which can be moved relative to one another in a lengthwise direction relative to the roof, and said top section is fixedly attached to said cover panel and said bottom section is fixedly attached to the roof.

22. The sunroof as claimed in claim 21, wherein said drive means moves said cover panel such that said cover panel is raised from said closed position and horizontally moved with respect to the roof into said opened position.

* * * * *